(12) United States Patent
Hector, Jr. et al.

(10) Patent No.: US 11,053,910 B2
(45) Date of Patent: Jul. 6, 2021

(54) APPARATUS AND METHOD FOR GENERATION OF ELECTRICITY UTILIZING PRESSURIZED HYDRO OR TURBOMACHINERY TECHNOLOGY

(71) Applicant: Go Team CCR LLC, Raleigh, NC (US)

(72) Inventors: Francis Norbert Hector, Jr., Raleigh, NC (US); Juan Keith Carroll, Littleton, NC (US)

(73) Assignee: CARROLL HECTOR, LLC, Raleigh, NC (US)

( * ) Notice: Subject to any disclaimer, the term of this patent is extended or adjusted under 35 U.S.C. 154(b) by 0 days.

(21) Appl. No.: 17/013,070

(22) Filed: Sep. 4, 2020

(65) Prior Publication Data

US 2020/0400114 A1 Dec. 24, 2020

Related U.S. Application Data

(60) Continuation-in-part of application No. 16/993,718, filed on Aug. 14, 2020, which is a division of application No. 16/713,359, filed on Dec. 13, 2019, now Pat. No. 10,781,787.

(60) Provisional application No. 62/779,686, filed on Dec. 14, 2018.

(51) Int. Cl.
*F03B 13/08* (2006.01)
*H02K 7/18* (2006.01)

(52) U.S. Cl.
CPC ........... *F03B 13/08* (2013.01); *H02K 7/1823* (2013.01)

(58) Field of Classification Search
CPC .............................. F03B 13/08; H02K 7/1823
See application file for complete search history.

(56) References Cited

FOREIGN PATENT DOCUMENTS

IN 201721045318 A * 4/2018 ............... H02N 2/18

* cited by examiner

*Primary Examiner* — Viet P Nguyen
(74) *Attorney, Agent, or Firm* — Shumaker, Loop & Kendrick, LLP

(57) ABSTRACT

A facility for generating electricity that includes a hydroelectric generating apparatus including an elongate penstock in flow communication with a source of water and a hydroturbine and piping for supplying refill water to a plurality of horizontal pistons on a synchronized and coordinated basis to supply pressurized water to the penstock. A cryogenic facility is provided and includes at least one cryogenically insulated storage tank for cryogenically producing and storing liquid air and a temperature regulator for allowing controlled transition from the liquid air state to a pressurized gaseous state for supplying pressurized air to a storage container for supplying air to the pistons. A containment facility is provided within which the cryogenic facility is encapsulated, and includes a mass of CCR having sufficient insulating capacity to maintain the liquid air in a liquid state in combination with the cryogenic facility.

21 Claims, 26 Drawing Sheets

APPARATUS AND METHOD FOR GENERATION OF ELECTRICITY UTILIZING PRESSURIZED HYDRO OR TURBOMACHINERY TECHNOLOGY

PRIORITY CLAIM

This utility patent application claims priority from U.S. patent application Ser. No. 16/993,718, filed on Aug. 14, 2020, which claims priority from U.S. patent application Ser. No. 16/713,359, filed on Dec. 13, 2019, which claims priority from Provisional Patent Application Ser. No. 62/779,686, filed on Dec. 14, 2018, the contents of which are incorporated by reference in this application.

TECHNICAL FIELD AND BACKGROUND OF THE INVENTION

This invention relates to an apparatus and method for generation of electricity using pressurized hydro and turbomachinery techniques to achieve more uniform and efficient electricity generation. Pump storage generation of electricity is well-known and is a type of hydroelectric energy storage used by electric power systems for load balancing. The method stores energy in the form of gravitational potential energy of water, pumped from a lower elevation reservoir to a higher elevation reservoir. Low-cost surplus off-peak electric power is typically used to operate the pumps. During periods of high electrical demand, the stored water in the higher elevation reservoir is released and allowed to fall through turbines to produce electric power. Although the inherent losses of the pumping process make such a facility an overall net consumer of energy, the system increases revenue by allowing the utility to sell more electricity during periods of peak demand when electricity prices are highest.

Pumped-storage hydroelectricity allows energy from intermittent sources, such as solar, wind, and other renewable sources, or excess electricity from continuous base-load sources such as coal or nuclear, to be saved for periods of higher demand. Because of the need to replenish the supply of stored water, pump hydro facilities are most often used with reservoirs upstream of a hydroelectric facility, with water being circulated as needed to balance load demand with supply.

The present invention is not a "pump storage" apparatus and method. Rather, the disclosed invention supplements a supply of water with a liquefied gas, for example, air, according several alternatives. As described in this application the supply of water is from, for example, a pond, tank or other water supply that is recycled to the water supply for reuse when needed. It is the use to which the water is put at any given time that results in the efficiency of the system described in this application. Electricity generated during peak demand periods is delivered to the grid for use by consumers, and electricity generated during off-peak demand periods is delivered to an air compressor, which compresses and stores the compressed air for use as a supplemental energy source which, in combination with the flowing water, provides increased and more uniform flow that can balance water flow rates and mimic the power of water falling from a high elevation in a system where the upstream intake is not significantly higher than the discharge end of the system. One feature of the invention is the use of residue from the generation of electricity by coal, such as CCR ("coal combustion residue") to serve the beneficial purpose of providing an insulating encasement of the operating components of the system with enhanced efficiency.

The system described in the application avoids the need to pump water up an incline into a storage reservoir and instead uses the electricity to compress air during off-peak usage periods. The air may be compressed to the point where it liquefies, providing a vastly greater amount of latent energy stored in a relatively small area.

The Turbomachinery process for liquefying air uses a heat source, a cooling medium (air, water or other), a circulating working fluid and a turboexpander. The system can accommodate a wide variety of heat sources such as geothermal hot water, exhaust gas from internal combustion engines burning a variety of fuels (natural gas, landfill gas, diesel oil, or fuel oil) and a variety of waste heat sources in the form of either gas or liquid.

The circulating working fluid (usually an organic compound such as R-134a) is pumped to a high pressure and then vaporized in the evaporator by heat exchange with the available heat source. The resulting high-pressure vapor flows to a turboexpander, where it undergoes an isentropic expansion and exits as a vapor-liquid mixture, which is then condensed into a liquid by heat exchange with the available cooling medium. The condensed liquid is pumped back to the evaporator to complete the cycle. One such system implements a Rankine cycle as it is used in fossil-fuel power plants, where water is the working fluid and the heat source is derived from the combustion of natural gas, fuel oil or coal used to generate high-pressure steam. The high-pressure steam then undergoes an isentropic expansion in a conventional steam turbine. The steam turbine exhaust steam is next condensed into liquid water, which is then pumped back to steam generator to complete the cycle.

When an organic working fluid such as R-134a is used in the Rankine cycle, the cycle is sometimes referred to as an organic Rankine cycle (ORC). When liquid air is expanded it becomes compressed air. The pressurized hydro system of this invention will not be running on Liquid Air, but compressed air. The use of liquid air is a method to store the air more economically. Air consists of 78% nitrogen, 21% oxygen, and trace gases making up the remaining 1%. The liquid to gas expansion ratio of nitrogen is 696 and the liquid to gas expansion ratio of oxygen is 861, with the expansion ratio of air being between these two values. Thus, the efficiencies achieved in being able to store a very large quantity of air in a relatively compact area is significant, although offset to some extent by the need to cryogenically maintain the air in a liquid state until ready for use.

Compression is part of the step/process to make liquid air: "The expansion causes a lowering of the temperature, and by counter-flow heat exchange of the expanded air, the pressurized air entering the expander is further cooled. With sufficient compression, flow, and heat removal, eventually droplets of liquid air will form, which may then be employed directly for low temperature demonstrations."

One example of how liquid air will be used in the pressurized hydro system in the electrical generation mode is that it will exit the liquid air storage area in piping which travels the entire circuitous path from the liquid air storage area to the pressure vessels and it will be expanded in pipes that run through water to dissipate the cold, then the compressed air will run thru ambient air to dissipate more cold, then the compressed air will pass several possible different types of heat exchanger to dissipate cold and to heat the air inside the piping and then to be momentarily/temporarily stored in the compressed air storage vessel before entering the pressure vessel. Liquid air energy storage systems are known. See US20090282840A1 and US20160178129A1. In general, the method includes the steps of providing a gaseous input, producing a cryogen from the gaseous input, storing the cryogen, expanding the cryogen, using the expanded cryogen to drive a turbine, and recovering cold energy from the expansion of the cryogen.

The invention contemplates using CCR as an insulating material. CCR has inherent insulating qualities and is available in vast quantities in locations throughout the world. Governmental laws and regulations provide opportunities for CCR to be used for beneficial purposes. In addition to CCR providing insulation value to keep system temperature stable, it can also be a mechanism to pay for a portion of the pressurized hydro system including energy store, energy exchanges, and air tanks.

Various embodiments of the invention include:

Using CCR for a beneficial use structure to provide insulation for Liquid Air storage; tank(s), using CCR and piping to store and the heat the CCR, and using CCR for water tank insulation.

Using electro-thermal energy storage principles to heat water and cool water for electrical energy production system or a pressurized hydro system. The piping for the compressed air for the pressurized hydro system can run through the water and/or a heat exchanger for both heating and cooling depending on what mode of operation is working.

Using CCR to insulate tanks filled with molten salt energy storage techniques.

Storing heated rocks in a CCR-insulated facility and using blown air mixed with air going into pressurized hydro vessels during the mode of operation.

The CCR static structures for the above embodiments could be used not only with pressurized hydro but any other energy production system where low cost insulating materials are desirable.

SUMMARY OF THE INVENTION

It is therefore an object of the present invention to provide an apparatus and method for generation of electricity using pressurized water and air as respective flow media, working together to achieve more efficient electricity generation.

It is another object of the invention to provide an apparatus and method for generation of electricity using pressurized water and air that enables electricity to be generated without the need for a physical drop of the flow media to create the force necessary to operate a turbine generator.

It is another object of the invention to provide an apparatus and method for generation of electricity using pressurized water and air that uses CCR as a construction material to enclose some or all of the operating components of the system.

It is another object of the present invention to provide an apparatus and method for generation of electricity using pressurized water and a liquid composition, such as air, as respective flow media, working together to achieve more efficient electricity generation.

It is another object of the invention to provide an apparatus and method for generation of electricity using pressurized water and a liquid composition, such as air, that enables electricity to be generated without the need for a physical drop of the flow media to create the force necessary to operate a hydro-electric generator.

It is another object of the invention to provide an apparatus and method for generation of electricity using pressurized water and a liquid composition such as air that uses CCR as a construction material to enclose some or all of the operating components of the system.

It is another object of the invention to provide an apparatus and method for generation of electricity using pressurized water and a liquid composition such as air that enables a very large quantity of latent energy to be stored in a compact area and converted to a pressurized gas when needed as a medium for generating electricity for storage or distribution through a power grid or otherwise.

According to one embodiment of the invention, a facility for generating electricity is provided that includes a hydroelectric generating apparatus including an elongate penstock in flow communication with a source of water and a hydro-turbine and piping for supplying refill water to a plurality of horizontal pistons on a synchronized and coordinated basis to supply pressurized water to the penstock. A cryogenic facility is provided and includes at least one cryogenically insulated storage tank for cryogenically producing and storing liquid air and a temperature regulator for allowing controlled transition from the liquid air state to a pressurized gaseous state for supplying pressurized air to a storage container for supplying air to the pistons. A containment facility is provided within which the cryogenic facility is encapsulated, and includes a mass of CCR having sufficient insulating capacity to maintain the liquid air in a liquid state in combination with the cryogenic facility.

According to another embodiment of the invention, the containment facility includes a compact mass of CCR intermixed with a heat exchange medium encapsulating a heat exchange pipe contained within the containment facility.

According to another embodiment of the invention, the containment facility is encapsulated in overlying multiple layers of material comprising CCR.

According to another embodiment of the invention, the facility for generating electricity includes a compressed air storage facility contained within a static structure having reinforced CCR sloped walls within which an enclosure encapsulated CCR-surrounded enclosure is formed, a circuitous piping system positioned within the static structure for storing large quantities of the compressed air and a liner system covering the surfaces of the static structure.

According to another embodiment of the invention, the facility for generating electricity includes a vegetative cover placed over the liner system.

According to another embodiment of the invention, the compressed air storage facility is constructed substantially below ground level and the circuitous piping system is encased in poured-in-place concrete and including concrete reinforcement elements for structural strength and stability.

According to another embodiment of the invention, the hydro-turbine assembly includes drive shaft on which is mounted a flywheel, generator and turbine mounted in mutually-fixed relation for rotation with the drive shaft. The flywheel includes an annular wheel housing, a liquid compartment formed in the wheel housing, a central chamber and a peripheral chamber interconnected for centrifugally induced liquid flow by a passageway. An enclosed volume of the liquid compartment is adapted to be partially filled with a low viscosity whereby as the flywheel rotates the liquid will move outward and upward by centrifugal force to facilitate non-pulsating rotation of the turbine and additional momentum to the movement of the flywheel caused by liquid.

According to another embodiment of the invention, the facility is a pumped-hydro facility including at least one hydroelectric pump generator.

According to another embodiment of the invention, the facility for generating electricity includes a raised elevation water storage reservoir formed by a base of CCR defining an angle of reposes and a water storage impoundment defined by raised impoundment walls constructed on the base and having their own angle of repose. The impoundment walls are formed of materials selected from the group consisting of roller-compacted concrete, strengthened CCR, and multiple layers of roller-compacted concrete. At least one water drain is positioned in a bottom of the water storage impoundment and including conduits to allow water to flow out of the impoundment through the drains and conduits and feed into the hydroelectric pump generators. The hydroelectric pump generators are adapted to reverse flow during low utilization periods. Outflow from the impoundment is adapted to generate electricity for use during peak use periods to supplement electricity generated by conventional electric utility generators.

According to another embodiment of the invention, the facility for generating electricity includes a compressed air storage facility for storing compressed air generated by hydroelectric pump generators during low utilization periods, the compressed air communicating through valves and conduits with the hydroelectric pump generators to generate electricity.

According to another embodiment of the invention, the facility for generating electricity includes a flywheel mounted for rotation on respective ones of the hydroelectric pump generators for increasing the efficiency of the hydro-turbine generator and a drive shaft around which are fixed for rotation with the drive shaft an annular wheel housing and a liquid compartment formed in the wheel housing. The liquid compartment includes a central chamber and an interconnected peripheral chamber for centrifugally inducing liquid flow through a passageway between the peripheral chamber and the central chamber. The liquid compartment is adapted to be at least partially filled with a low viscosity liquid that will move outward and upward by centrifugal force once the rotation of the flywheel begins.

According to another embodiment of the invention, the facility for generating electricity includes a heat exchange static structure constructed of a compact mass of CCR with other heat exchange media encapsulating at least one heat exchange pipe for circulating air, water or other flowable media for transferring heat via temperature differential to the surrounding CCR/heat exchange media. The heat exchange static structure is surrounded by a mass of insulating CCR.

According to another embodiment of the invention, heat given off to or absorbed from the surrounding heat exchange media is adapted to be transported to the temperature regulator for allowing controlled transition from the liquid air state to the pressurized gaseous air state for supplying pressurized air to a storage container and for supplying air to the pistons of the hydroelectric generating apparatus.

According to another embodiment of the invention, the pipe comprises a plurality of pipes, each having a single outlet and functioning as a storage facility for air in a liquid or gaseous state.

According to another embodiment of the invention, the pipe comprises a plurality of pipes functioning as conduits adapted to circulate air, water or other flowable media for giving off to or absorbing heat from the surrounding heat exchange media.

According to another embodiment of the invention, a heat exchange facility is provided that includes a plurality of tanks encapsulated in a large mass of CCR insulating material and in which are positioned respective pipes for circulating air, water or other flowable media for giving off to or absorbing heat from the surrounding heat exchange media.

According to another embodiment of the invention, the tanks are encapsulated in a large mass of CCR insulating material.

According to another embodiment of the invention, some of the plurality of tanks are dedicated to heat transfer in a first temperature flow direction and other of the plurality of tanks are dedicated to heat transfer to a second temperature flow direction.

According to another embodiment of the invention, the plurality of tanks dedicated to heat transfer in a first temperature flow direction are flow isolated from the other of the plurality of tanks dedicated to heat transfer to a second temperature flow direction.

According to another embodiment of the invention, the plurality of tanks dedicated to heat transfer in a first temperature flow direction are flow interconnected with the other of the plurality of tanks dedicated to heat transfer to a second temperature flow direction, the direction of flow of the flow medium adapted to be controlled to maintain an overall predetermined temperature of the flow medium to operate the hydroelectric generating apparatus.

According to another embodiment of the invention, the heat exchange facility includes the large mass of CCR insulating material and an inner core comprised of heat exchange materials selected from the group consisting of CCR aggregates, CCR briquettes, salt, and rock.

DETAILED DESCRIPTION OF A PREFERRED EMBODIMENT AND BEST MODE

The design described in this application take into consideration air/water interactions, which are well understood. An aspect of this invention is that multiple types of pressurized vessels can be used, with or without piston/cylinder assemblies. The invention will be designed around several engineering factors, some of which are the operational pressures of the system and the designed electrical energy to be produced in a specific time duration, which will determine the required air pressure, air flow rate and water flow requirements. Another design consideration is the elevation of the water supply source as it relates to the differential elevation, if any, of the pressure vessel and the hydroelectric turbine.

Figure 1:
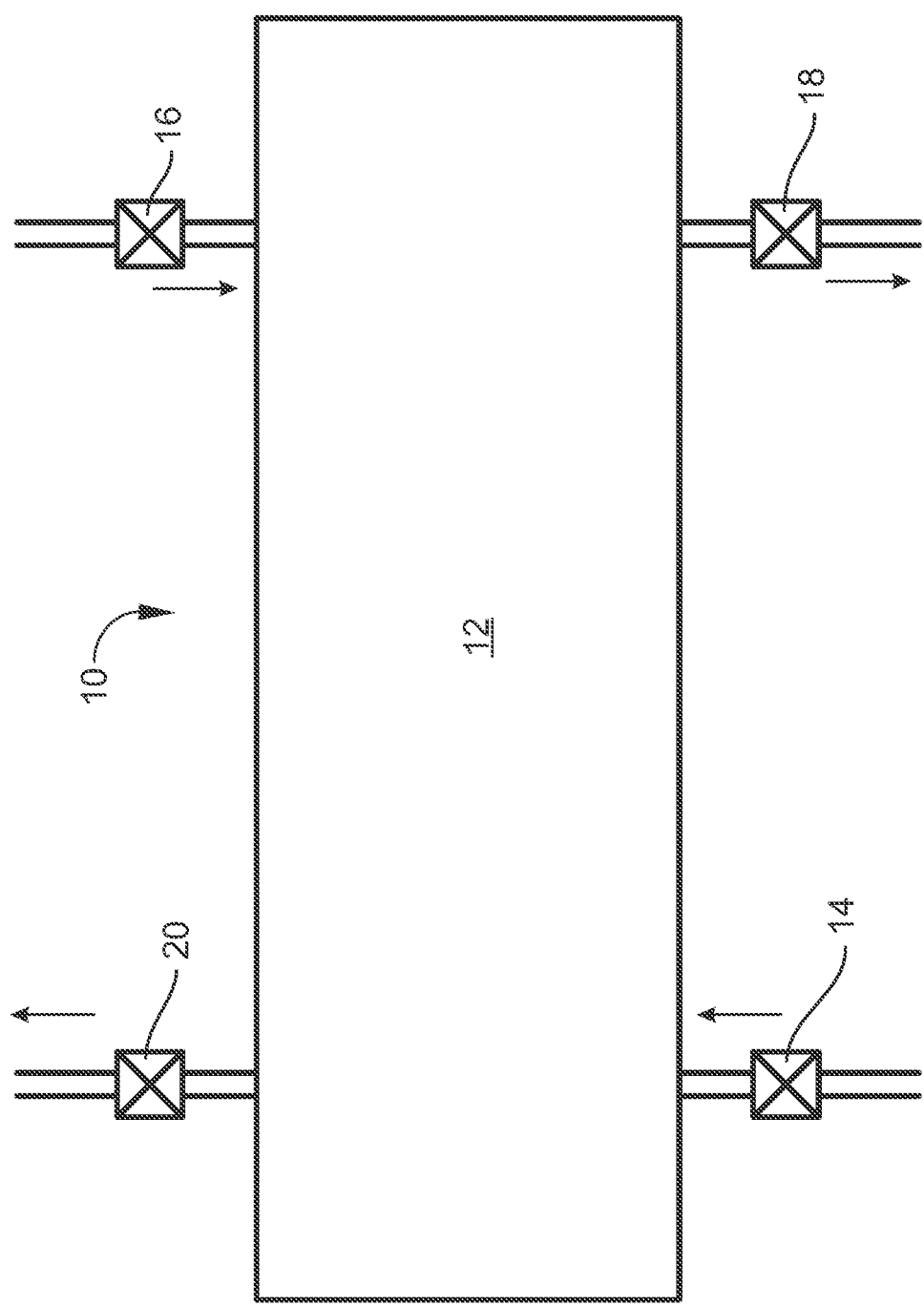
FIG. 1 is a pressure vessel assembly that can be placed at different elevations relative to a water source.

One type of vessel that can be used in accordance with the invention is a horizontal pressure vessel that can be placed at different elevations relative to the water supply source, including in and/or under a water source. FIG. 1 shows a side view of such a pressure vessel assembly 10 in a simple application that includes a pressure vessel 12 with one or multiple valves 14 with related piping to fill the pressure vessel 12 with water. One or multiple valves 16 with related piping to allow pressurized air to enter the pressure vessel 12 after the pressure vessel 12 has been filled with water. One or multiple valves 18 with related piping allow the water to proceed to the penstock and then to the hydroelectric turbine under pressure from air and possibly gravity depending on the layout of the piston and penstock relative to the hydroelectric turbine. One or multiple valves 20 and related piping that will exhaust the pressurized air from the pressure vessel when the water in the water is forced into the penstock through valve 18 on its way to a hydroelectric turbine.

Alternatively pneumatic piston/cylinder assemblies may be used in lieu of the valves 16, where the piston/cylinder assemblies push one or more plates that force water under pressure out of the pressure vessel 12.

These valves 14, 16, 18, 20 will be operated by a programmable logic system that controls the apparatus by opening and closing the valves 14, 16, 18, 20 in a synchronized fashion. This will also be coordinated with additional pressure vessel assemblies 10 connecting to the same penstock which leads to the hydroelectric turbine that can allow for a continuous water filling, water pushing and water refilling of pressure vessels 12 to keep a continuous flow of pressurized water to the hydroelectric turbine in a predetermined flow and pressure rate. With the apparatus in this application capable of operating with high air pressures applied to the water inside of the pressure vessels 12, specific features are included as options.

Figure 2:
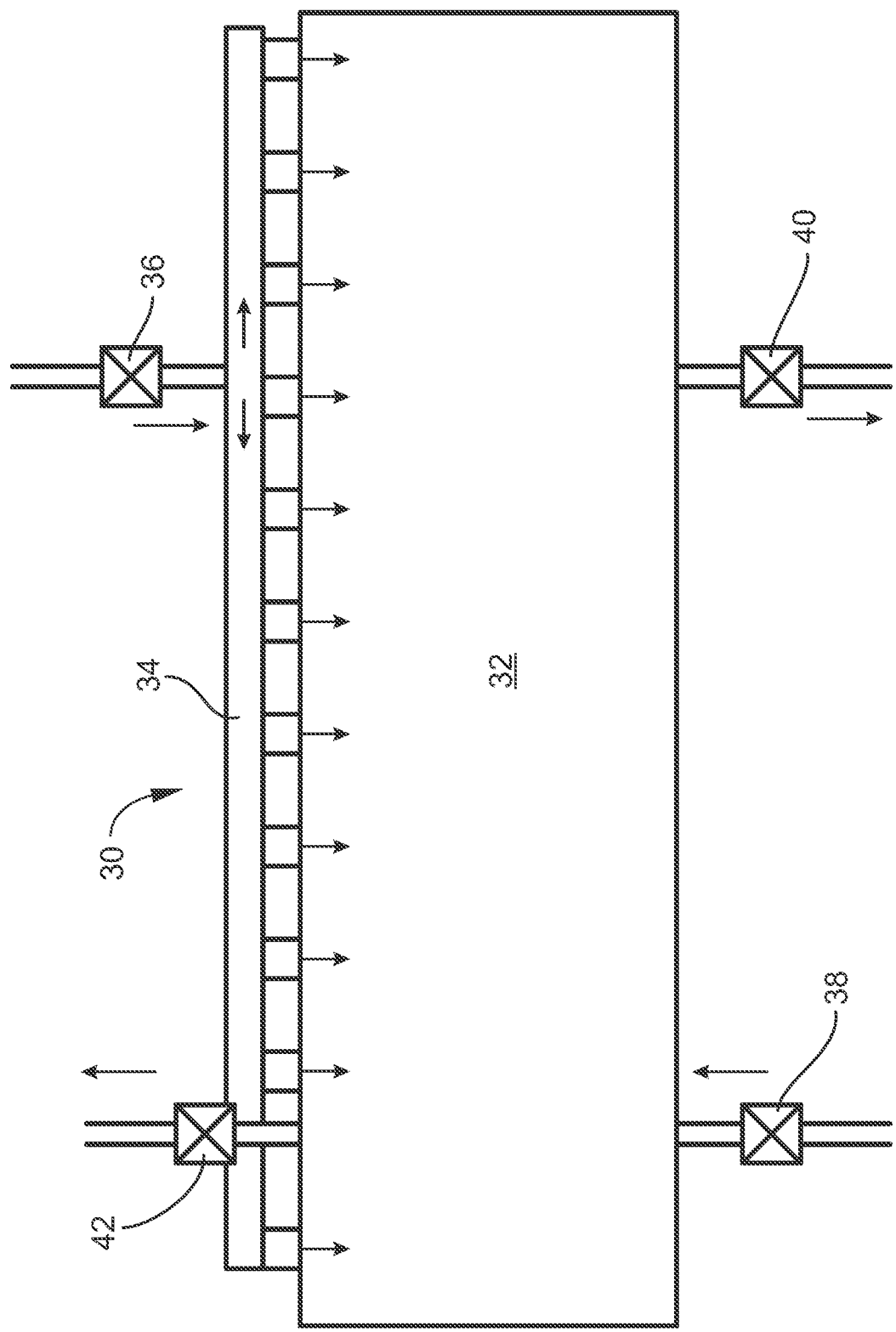
FIG. 2 is a side elevation of a pressure vessel assembly with an air manifold system.

FIG. 2 shows a side view of a pressure vessel assembly 30 with a pressure vessel 32 that has an air manifold system 34 which is used to spread the air pressure in a more evenly distributed fashion over the top of the water surface in the pressure vessel 32. The manifold air system 34 can be constructed on the exterior (as shown) or the interior of the pressure vessel. One or more multiple valves 38 with related piping fill the pressure vessel 32 with water. One or multiple valves 36 with related piping to allow pressurized air to enter the pressure vessel 32 through the manifold 34 after the pressure vessel 32 has been filled with water. One or multiple valves 40 with related piping allow the water to proceed to a penstock and then to a hydroelectric turbine under pressure from air and possibly gravity depending on the layout of the pressure vessel assembly 30 relative to the hydroelectric turbine. One or multiple valves 42 and related piping that will exhaust the pressurized air from the pressure vessel when the water in the pressure vessel 32 is forced into the penstock through valve 40 on its way to a hydroelectric turbine.

Figure 3:
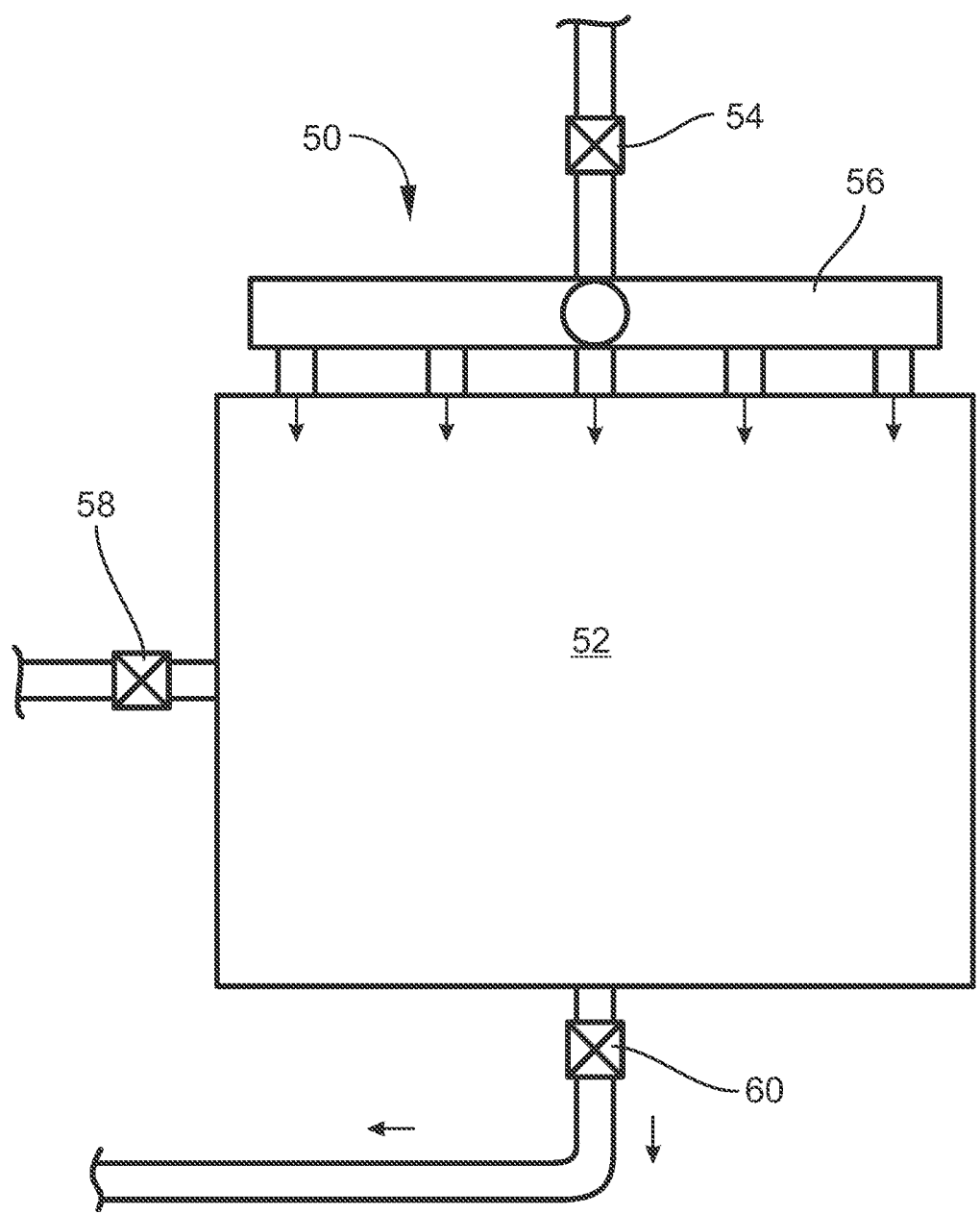
FIG. 3 is a cross section of one design layout for the general type of system shown in FIG. 2.

FIG. 3 shows a cross-section of one of another embodiment, in which a pressure vessel assembly 50 includes a pressure vessel 52 charged with high pressure water through a valve 54 that is distributed through a manifold 56 into the pressure vessel 52, pressurizes water introduced into the pressure vessel 52 through a valve 58 and discharges the pressurized water/air mixture from the pressure vessel 52 through a valve 60 and downstream to a penstock or other receiving apparatus.

Figure 4:
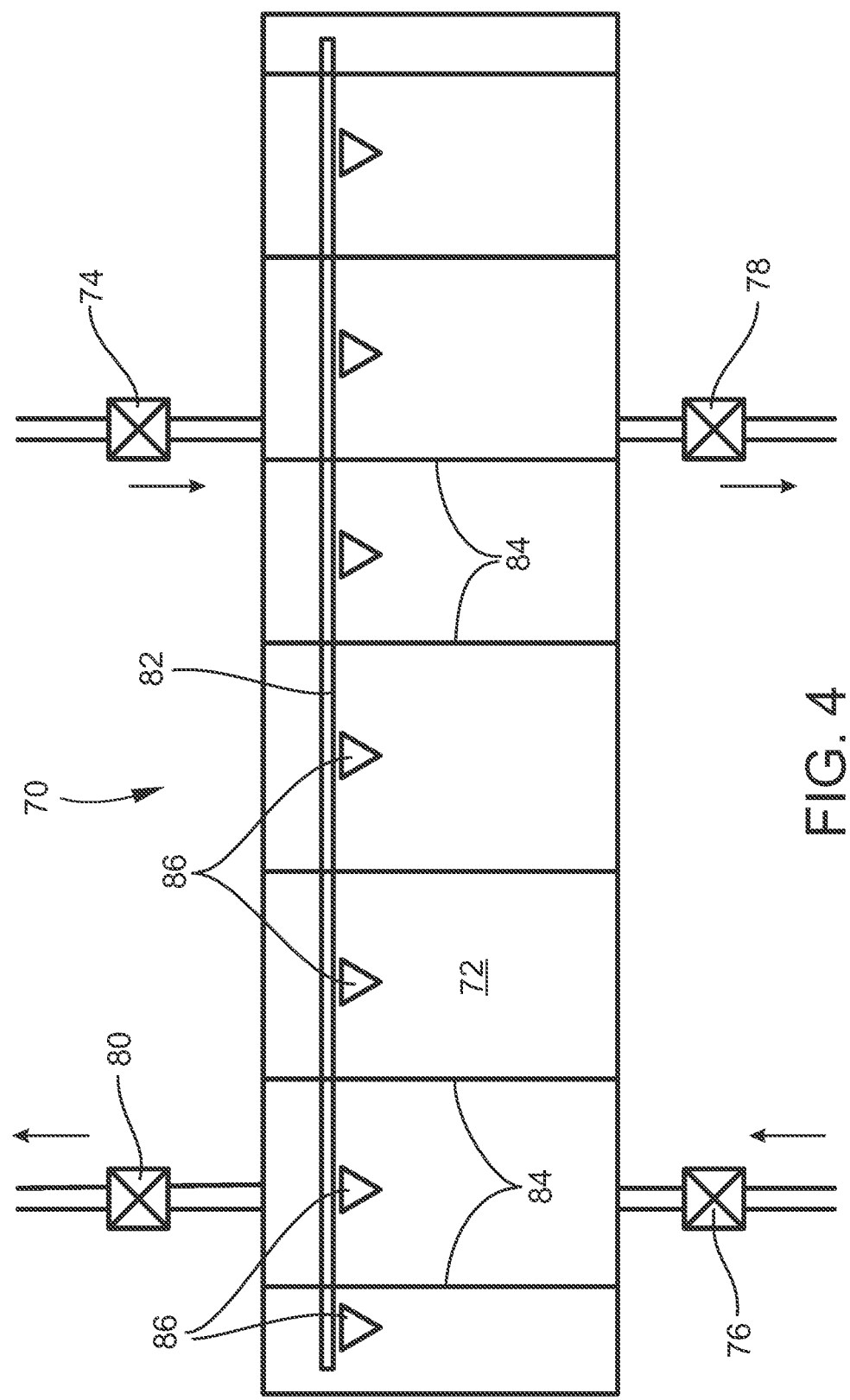
FIG. 4 shows a side view of another system that can be used to distribute pressurized air evenly across the surface of water.

FIG. 4 shows a side view of another embodiment that can be used to distribute pressurized air evenly across the surface of a water supply to be pressurized. A pressure vessel assembly 70 with a pressure vessel 72 in which one or more multiple valves 74 with related piping fill the pressure vessel 72 with air. One or multiple valves 76 with related piping to allow pressurized water to enter the pressure vessel 72. One or multiple valves 78 with related piping allow the water to proceed to a penstock and then to a hydroelectric turbine under pressure from air and possibly gravity depending on the layout of the pressure vessel assembly 30 relative to the hydroelectric turbine. One or multiple valves 80 and related piping that will exhaust the pressurized air from the pressure vessel 72 when the water in the pressure vessel 72 is forced into the penstock through valve 78 on its way to a hydroelectric turbine.

In the embodiment of the pressure vessel assembly 70, a perforated plate 82 is mounted in the pressure vessel 72 on guide rails that keep the perforated plate 82 in proper position as it goes from the top of the pressure vessel 72 to the bottom when pressurized air enters the top of the pressure vessel 72 through valve 74 and then back to the top of the pressure vessel 72 when the refill water is entering the bottom of the pressure vessel 72 through valve 76. The location of valves 75, 76, 78, 80 and the direction of the plate 82 can vary. Pontoons 86 can be used on the underside of the plate 82 to give the plate 82 neutral buoyancy. In operation a series of pressure vessel assemblies 70 operate in an out-of-phase sequence whereby individual pressure vessel assemblies are simultaneously in different operational phases such that the water output is continuous and at a steady, predetermined pressure.

Figure 5:
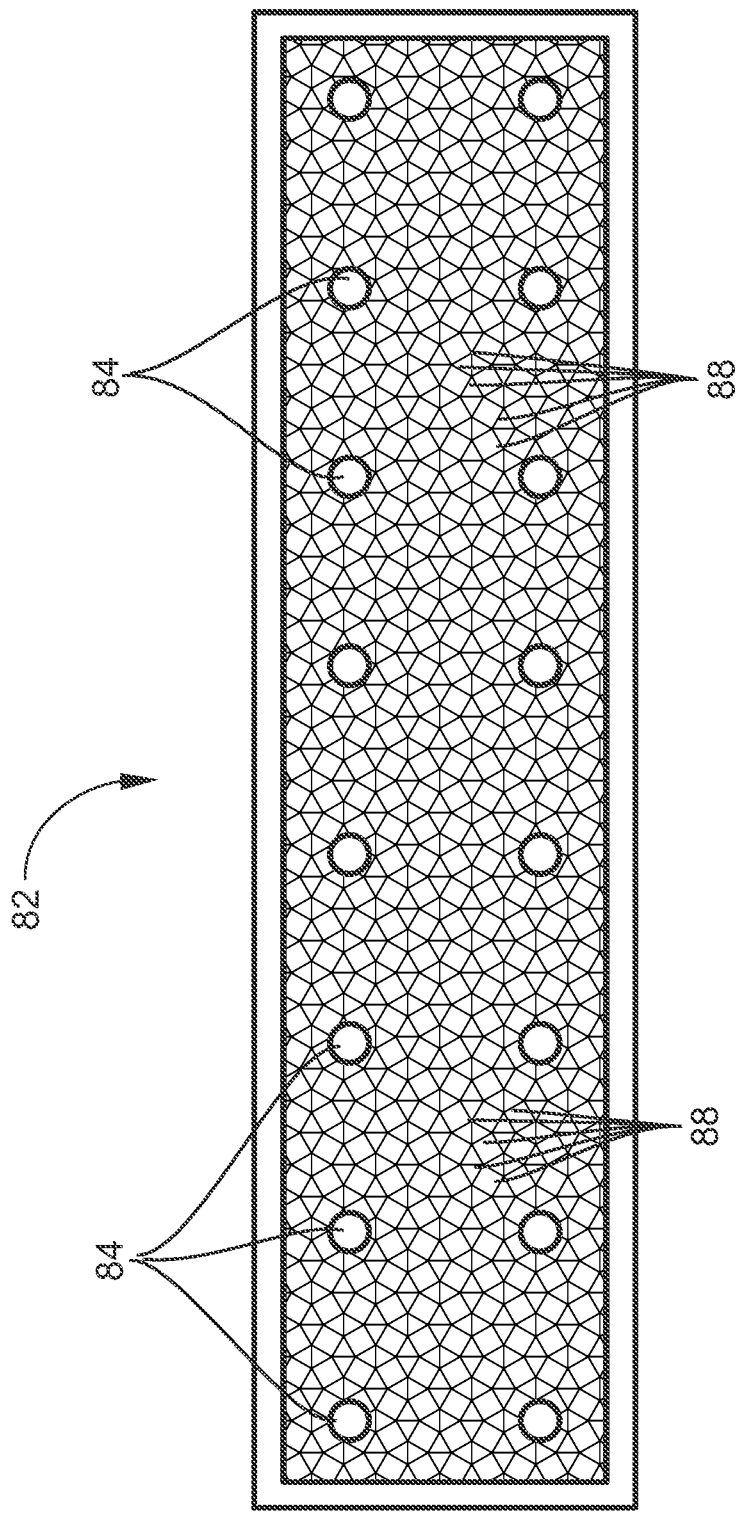
FIG. 5 is a cross-section of FIG. 4 directly over the perforated plate of FIG. 4.

FIG. 5 shows a section cut of FIG. 4 directly over the perforated plate 82. The perforations 88 of the plate 82 are engineered to allow for the air to be evenly distributed across the top of the plate 82 and the water surface. The guiderails 84 can be designed using many alternative suitable materials, sizing and spacing, but as example, 2-inch stainless steel rails 84 spaced 10 feet on center could be used.

Another design feature for the pressure vessel assemblies according to embodiments of the invention include an expandable and collapsible bladder system placed inside of a pressure vessel that allows the interaction between the pressurized air and water to work effectively while separated. Bladder systems could be made from many different types of materials, and one source of a bladder system could be Dryhoff Ltd. and another source could be Blue Ocean Tackle I.

Another type of pressure vessel that can be used is a stair-step pressure vessel assembly. This type of pressure vessel assembly can be used, for example, when water is pumped to an elevated plateau as explained in applicant's U.S. Pat. No. 10,301,223 for CCR static structures and the hydro-turbine is at a lower elevation.

Figure 6:
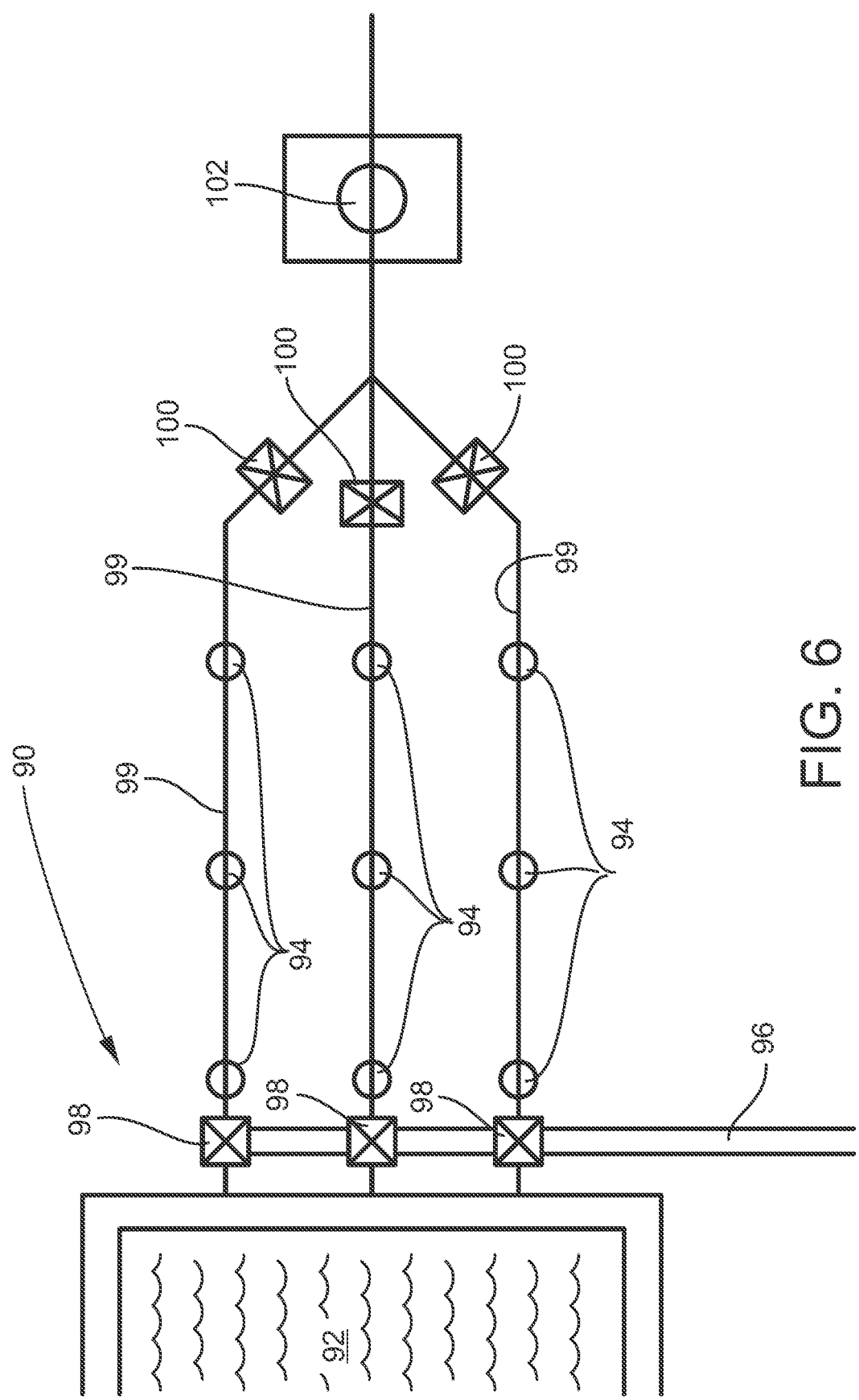
FIG. 6 is a plan view of a CCR static structure used for a pumped-hydro storage facility.

FIG. 6 shows a top view of a pressure vessel assembly 90 that is part of a CCR static structure 92 used to feed a pumped-hydro storage facility, with vertically stair-step positioned pressure vessels 94 with water being pushed with pressurized air from an air piping system 96 through sequentially opened and closed valves 98 and downstream through sequentially opened and closed valves 100 arranged in series along conduits 99 to a hydroelectric turbine 102 as described in detail in U.S. Pat. No. 10,301,223.

Figure 7:
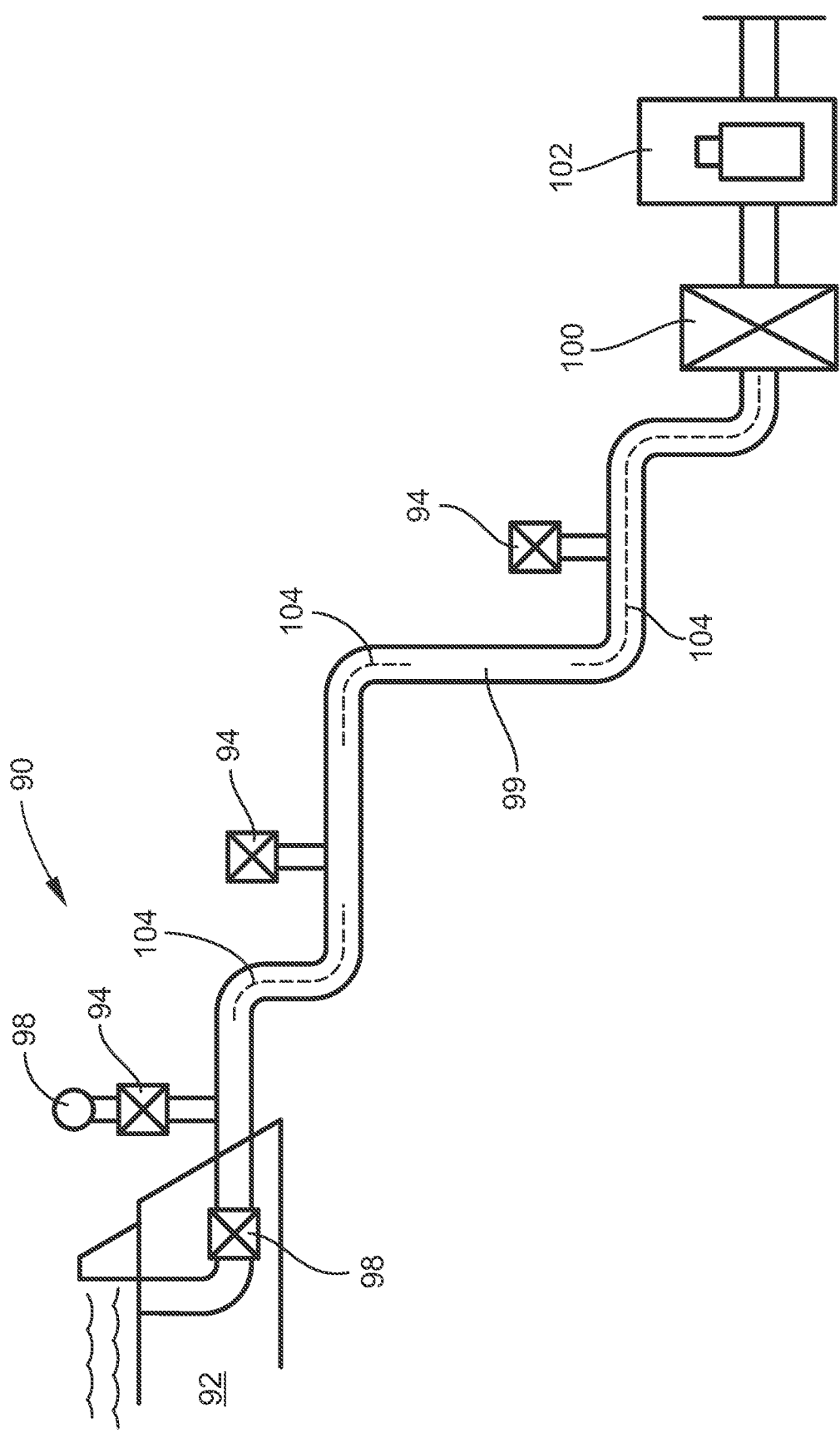
FIG. 7 is a cross-section of FIG. 6.

FIG. 7 is a vertical cross-section of FIG. 6.

Figure 8:
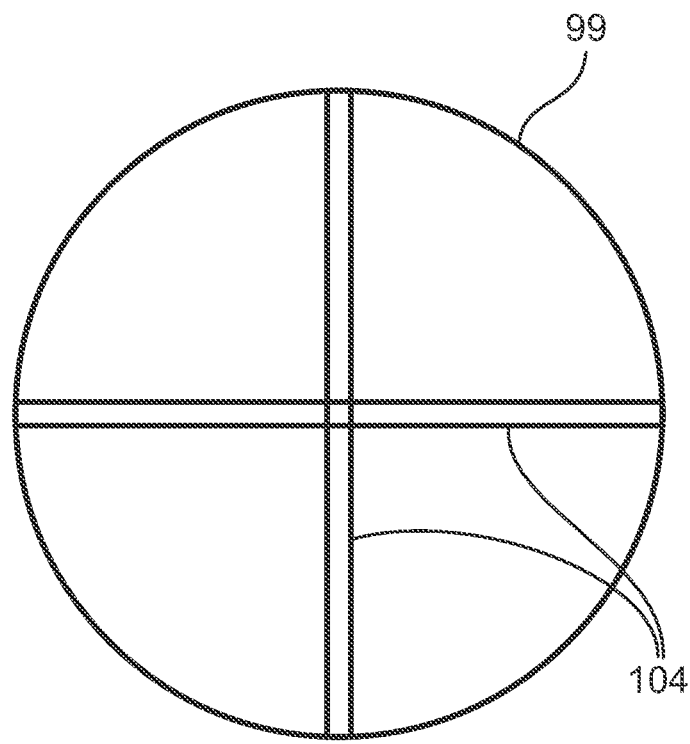
FIG. 8 is a cross-section of a pressure vessel where a divider plate is located.

When a stair-step pressure vessel arrangement is being used with pressurized air applications, a divider plate 104 is preferably used. FIG. 8 shows a cross section of a conduit 99 in which a divider plate 104 is positioned. The divider plate 104 shown is a 4-section divider, but the divider can have many additional sections if required. The divider plate 104 is designed so when there is an elevation change in the conduit 99 from the higher elevation to the lower elevation horizontal section, the air will not proceed ahead of the water on the upper side of the conduit 99 as the air would otherwise do in an angled pipe. The water will stay uniform in the confined volume between the top elevation of the assembly 90 and the hydroelectric turbine 102 elevation.

All the pressure vessels in this application can be filled and refilled with water by either gravity, run-of-the river, or using mechanical pumping equipment, depending on engineering design, site elevation conditions and the overall best approach. The filling of pressure vessels with mechanical pumps will decrease the fill rate time, which will allow for smaller pressure vessels and therefore less capital cost for the construction of the pressure vessels, but with increased capital and operation cost added for the mechanical pumping equipment.

There are many different configurations of the pressure vessels that can be adapted for use in connection with this invention. The pressure vessels shown are for illustration purposes and are not intended to be a limitation for the many configurations that can be used. These can include assemblies that are combined from stair-step transitioning to horizontal or horizontal transitioning to vertical as just two of many examples. In lieu of stair-stepped systems, an angled pipe could be used to fill a horizontal pressure vessel, with the air inflow valve 96 connected to the horizontal pipe. All the above design features can be used in aggregation, if required.

The pressure vessel assemblies described above are shown and described as pipes and rectangular shapes, but many different shapes and materials including composite materials, HDPE, steel, concrete, fiberglass piping, concrete tunnels, existing and new natural rock formations which have been tunneled, etcetera can be used for the construction of pressure vessels and penstocks.

A piston-type pressure vessel assembly based on using pneumatic cylinders and/or hydro-pneumatic cylinders and push plates is described below. The valves for air inflow and outflow may or may not be the same type for water inflow and outflow. Engineering factors that must be considered when selecting valves and valves types include pressure, flow rate, friction loss, temperature, closing and opening time and operational actuators.

One example of a valve that could be used is a Tri Lok Triple Offset manufactured by BRAY valves. When a lower pressure system is used, a less expensive knife valve or other types of valves could be used, for example, a knife gate valve. When large pistons are used, a slower opening and closing ball valve could be used.

The assembly shown in FIG. 1 through FIG. 8 in this application depicts one valve for each air inflow and outflow and one valve for each water inflow and outflow. In many applications there can be a large number of valves for each inflow and outflow process. Some of the reasons for this multiple valve approach is that the opening and closing times for smaller valves are shorter in duration and very large valves are sometimes more expensive for a given overall flow rate versus multiple smaller valves of the same aggregate flow rate. The number of valves on a given pressure vessel for air may be different than the number of valves required for water. The reason for this is that the rate of flow may be different for water than for air for the same size valves depending on the pressure applied. This is particularly true when the pressurized air is in an initial state as liquefied air before allowing the liquefied air to transition to a gaseous pressurized state for use as the pressure medium described in this application.

The apparatus invention in this application can operate with a single or double piston with or without the option of adding a flywheel coupled to the hydro-turbine (as described below), but it is envisioned that many systems for this invention will have three or more pistons which does not need a flywheel attached. The apparatus invention in multiple piston applications, once the system is set into operational mode, will have a continuous cycling of filling pressure vessels? with water, inflow of air, outflow of water towards the hydro-turbine and releasing of the pressurized air and then repeating the cycle numerous times during energy production time frames. Valves on the same or other pressure vessel will be opening and closing continuously to keep the water and air flows at the required engineered design pressure and flow rates.

A programmable logic controller in addition to controlling the pressure vessel and valves will monitor and control the entire apparatus. Pressure sensors and flow rate sensors can be part of the control system.

The system and controllers will be designed so that for each specific pressure vessel the air inflow valve will be shutting off when the water outflow valve is closing and at the same time the air exhaust valve will be opening to not cause a water hammer effect. Simultaneously or directly thereafter when these process valves are opened and closed, the water infill valve will be opened to refill the piston with water.

Gas regulators and/or valves will be used in the system to control the required air pressure from the compressed air energy storage volume to the pressure vessel and/or manifold system prior to the valves, whether the air is in a liquid pressurized state or a gaseous pressurized state. The air pressure and flow rate of the air can be monitored, if required, by the control system.

Site locations will vary in geotechnical and geographical conditions which will require different design layouts and features for the most favorable use of this apparatus invention. There are several engineering layouts in which the invention can be designed, but for examples in this application they are broken down into three (3) categories which are:

1. Recirculating water source;
2. Non-recirculating water source;
3. Man-made structure for recirculating water.

Recirculating water sources can be many and varied including, as examples and not as limitations, water sources from lakes, ponds, oceans, the Gulf of Mexico and other natural waterbodies. Coal Combustion Residual (CCR) ponds, which have been or will be created after CCR is removed from existing coal ash ponds as required by the 2015 EPA rule titled "Disposal of Coal Combustion Residuals from Electric Utilities Rulemakings" also known as the Federal CCR rule and subsequent court rulings, may be suitable water sources. CCR ponds can vary in size from a few acres to over one thousand acres, such as the Little Blue Run Pond.

Figure 9:
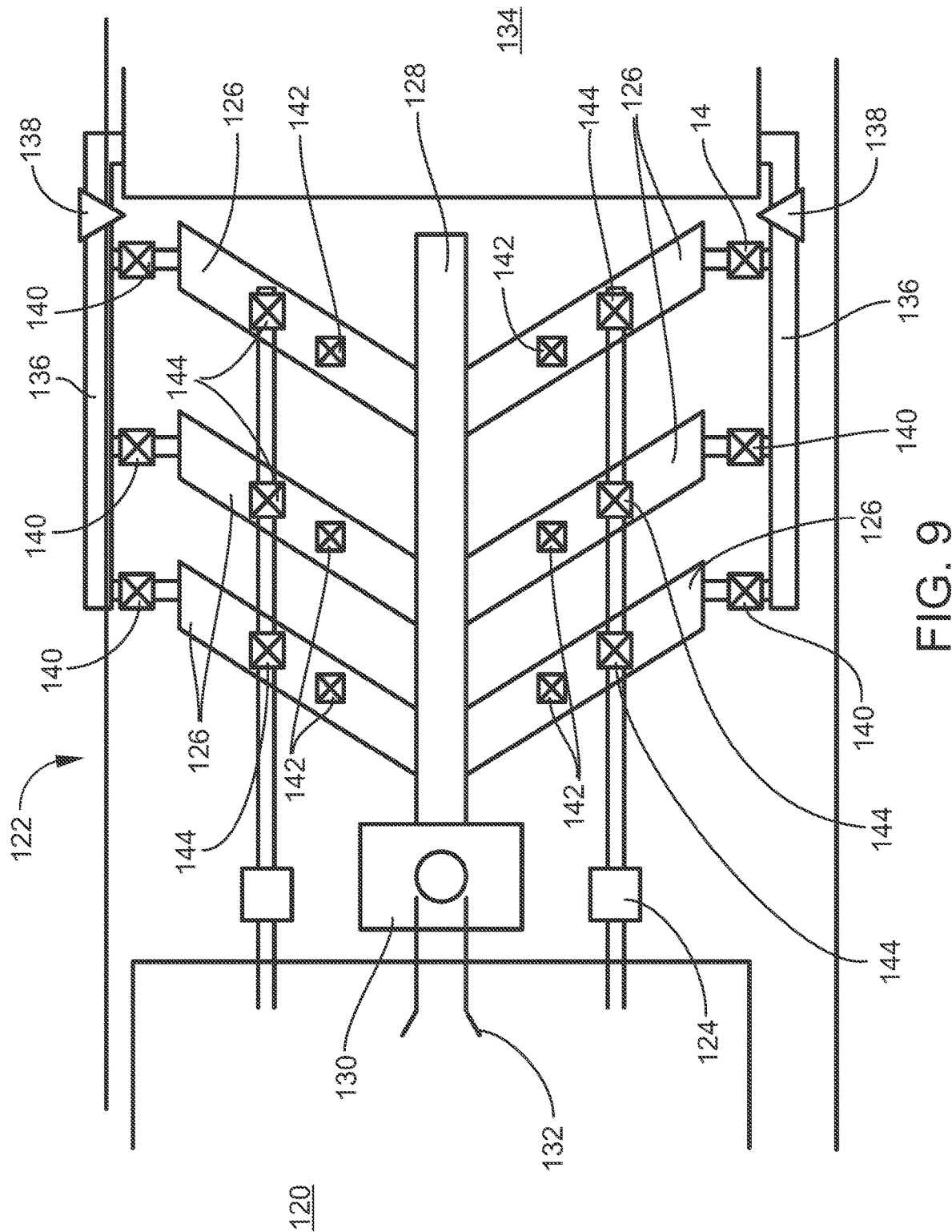
FIG. 9 shows a site layout of a water impoundment that and an apparatus according to one embodiment of the invention of this application.
Figure 10:
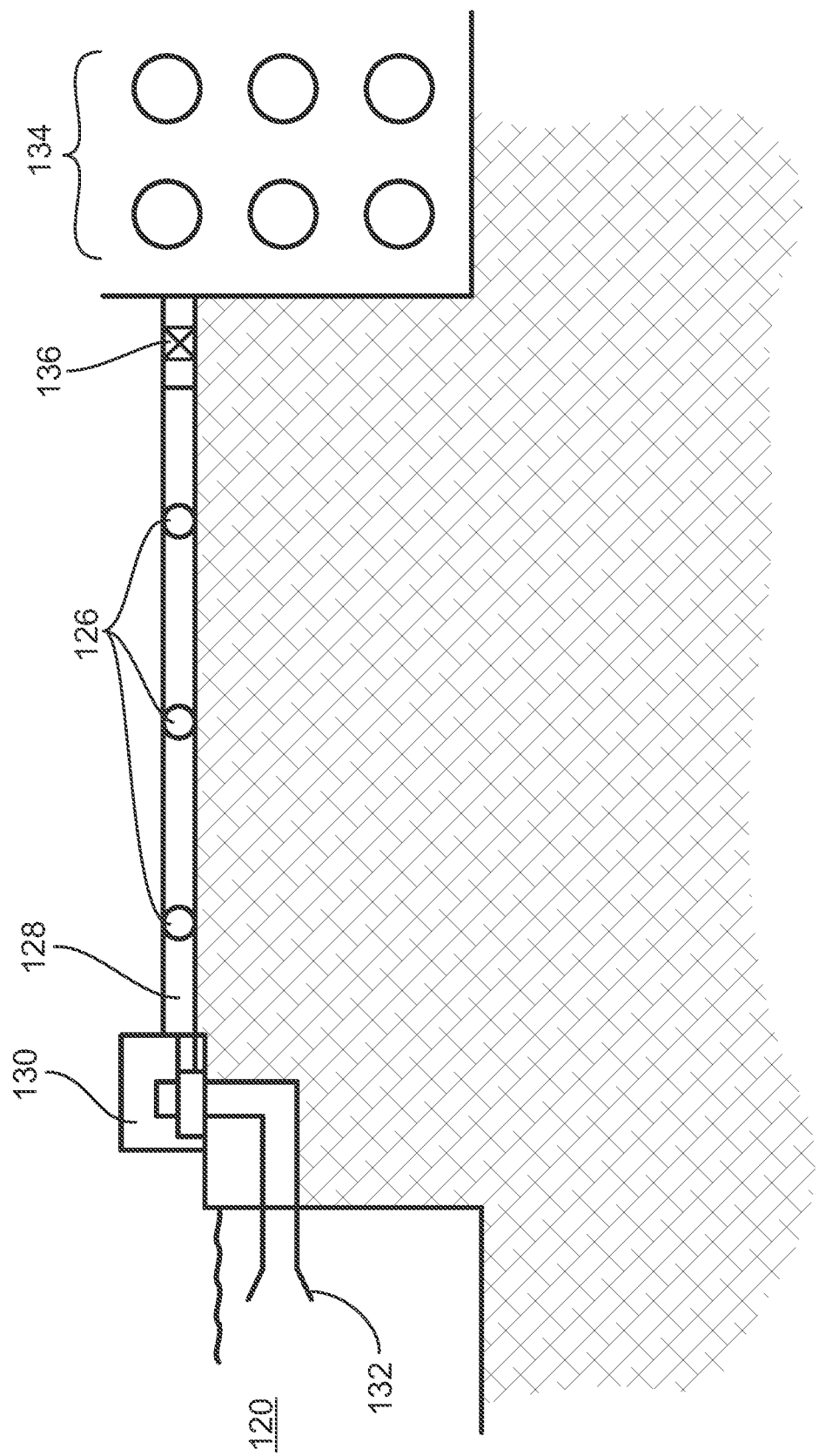
FIG. 10 is a cross-section of FIG. 9.

FIGS. 9 and 10 show a site layout of a water pond 120 that has a hydroelectric generating apparatus 122 included in this application with force main type refill pumps 124 that supply refill water to horizontal pistons 126 and incorporates the manifold system and plate system with guide rails as shown in FIG. 1 thru FIG. 5 that on a synchronized and coordinated basis supplies pressurized water to the penstock 128 which flows to the Hydro-turbine 130 that discharges water in a recirculated fashion back into the pond 120 at the discharge point 132. The pressurized air storage system 134 supplies air to the pressure vessels via air piping 136 after it passes a pressure regulator 138. The air inflow into the pressure vessels is controlled by the programmable logic controller as is passes through valve 140. The air exhaust/release valve 142 can release the pressurized air in the pressure vessel after use to the atmosphere or have associated piping to reuse a portion of the pressurized air in pressure vessels as will be described below. The water inflow valve 144 will open to allow for refilling of the pressure vessel once the air release valves 142 are open. These pressure vessels are still depicted with one valve for each process use with the understanding that large pressure vessels can have multiple valves for air and water inflow and outflow for each pressure vessel.

Many other depictions for use of the invention apparatus with a recirculating water application can be used, but the same basic principles apply. When the water source is much higher in elevation than the pressure vessel, the stair-step piston as shown in FIGS. 6, 7 and 8 can be used. In lieu of the stair-stepped pressure vessel, a water conveyance pipe can bring supply water down to horizontal pressure vessels if this is determined to be the best approach.

Another application for a recirculating water source is to use off-peak electricity (or other energy sources such as windmills and solar energy) to pump water to a higher elevation for storage for use in conjunction with the apparatus invention during periods when energy production is required. The re-fill pumps 124 referenced on FIG. 9 use a parasitic load which subtracts from the net energy produced during energy production time periods. When water is pumped to a higher elevation, less energy will be required to continuously refill the water pressure vessel during peak energy time periods, and refill pumps may or may not be used in the design.

Figure 11:
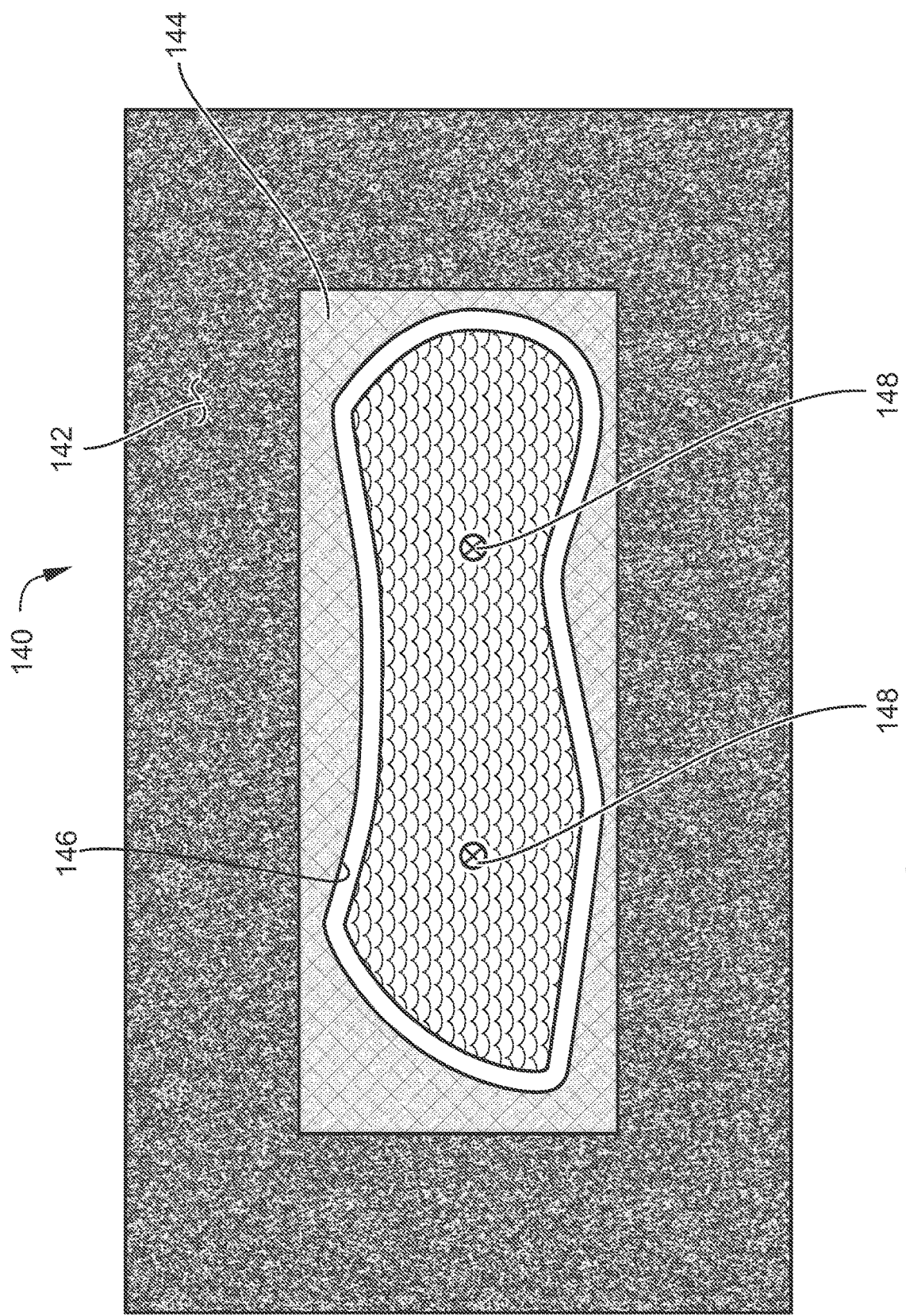
FIG. 11 illustrates an application where CCR is used to create a pumped hydro facility in accordance with U.S. Pat. No. 10,301,223 B2.
Figure 12:
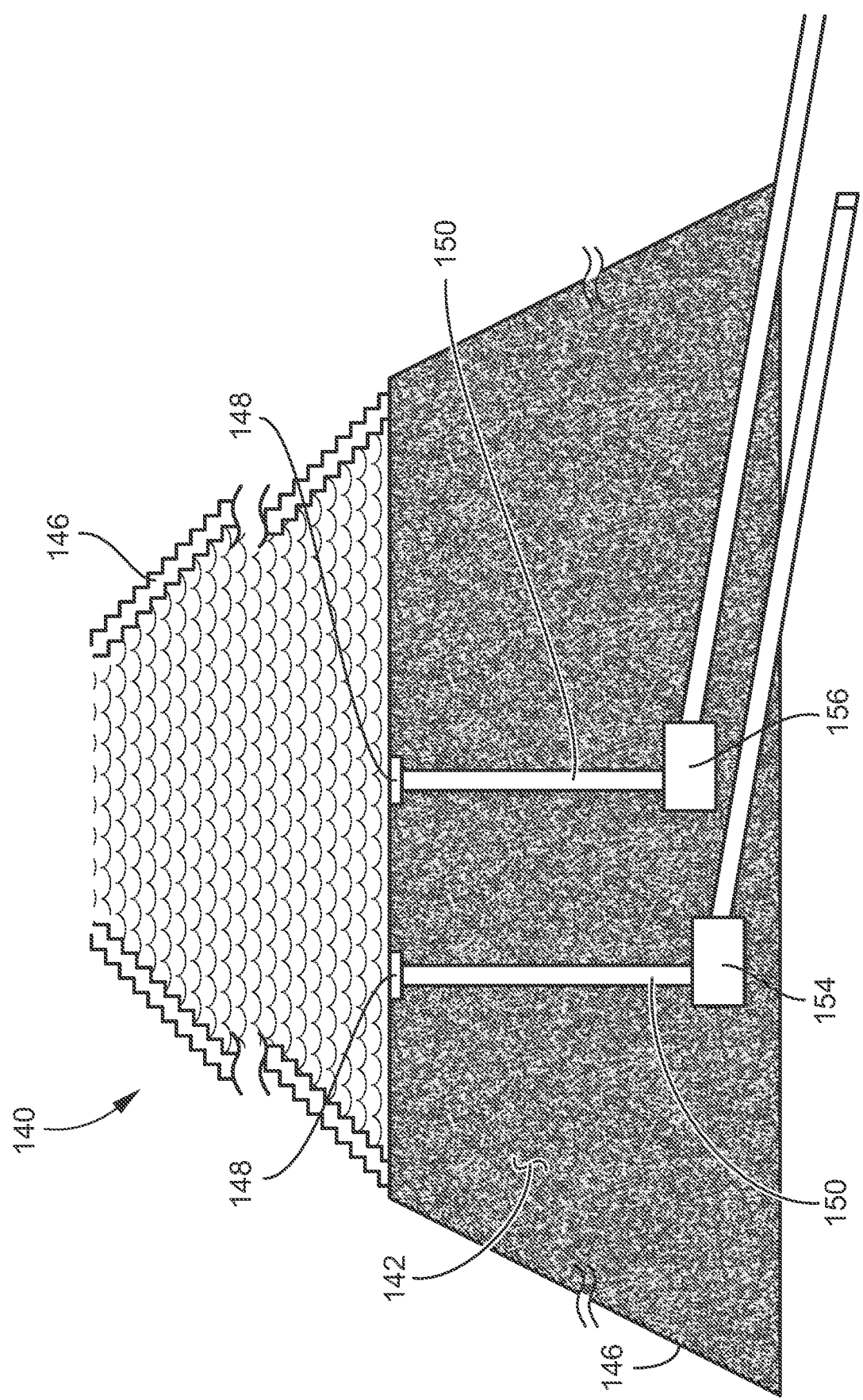
FIG. 12 is a cross-section of FIG. 11.

Referring now to FIGS. 11 and 12, FIG. 11 shows an application where CCR is used to create a pumped hydro facility in accordance with U.S. Pat. No. 10,301,223. FIGS. 11 and 12 show the pumped storage created using coal combustion residuals (CCR), but many other know types of construction materials and means and methods can be used in lieu of CCR. One example of many would be to construct a roller-compacted concrete dam on existing geotechnical features that is higher in elevation to the pistons. Another application would be to use depleted rock quarries and/or surface mines that contain water.

FIGS. 11 and 12 disclose a raised elevation water storage reservoir 140 formed by first constructing a base 142 of CCR formed to a suitable size with slopping sides according to civil engineering principles with an angle of repose, including margin of error appropriate to the engineering requirements. The CCR may contain additional constituents as required to enhance stability, resistance to environmental factors, and the like. The CCR material maybe covered with a suitable protective barrier, such as soil, vegetation, plastic, textiles or a combination of these or other materials.

A water storage impoundment 144 is constructed on the base 142, having its own angle of repose which may be the same, or different than that of the base 142. The walls 146 of impoundment walls 146 are formed of roller-compacted concrete or strengthened CCR, or multiple layers of each of these materials. While the impoundment 144 maybe filled from the top, either by inflow from rivers, water supply conduits and/or rainfall, the preferable utility is achieved by utilizing the construction as a pump/storage system.

As also shown in FIGS. 11 and 12, the impoundment 144 includes drains 148 that feed conduits 150. Variable flow valves, not shown, are provided to allow water to flow out of the impoundment through the drains 148 through conduits 150 that feed into hydroelectric pump/generators 154 and 156. Outflow from the impoundment generates electricity that can be used during peak use periods to supplement electricity generated by conventional electric utility generators, such as coal or gas-fired, nuclear or other hydroelectric generators. In low utilization periods, such as at night, excess electricity from these other conventional electric utility generators can be used to power the pump/generators 154 and 156, which are reversed and pump water into the impoundment through the drains 148.

Because of the status of CCR as a waste product that is easily shaped and compacted, it can be used to construct bases and similar structures having a wide range of sizes and shapes that can be conformed to size and space requirements of the surrounding land.

Figure 13:
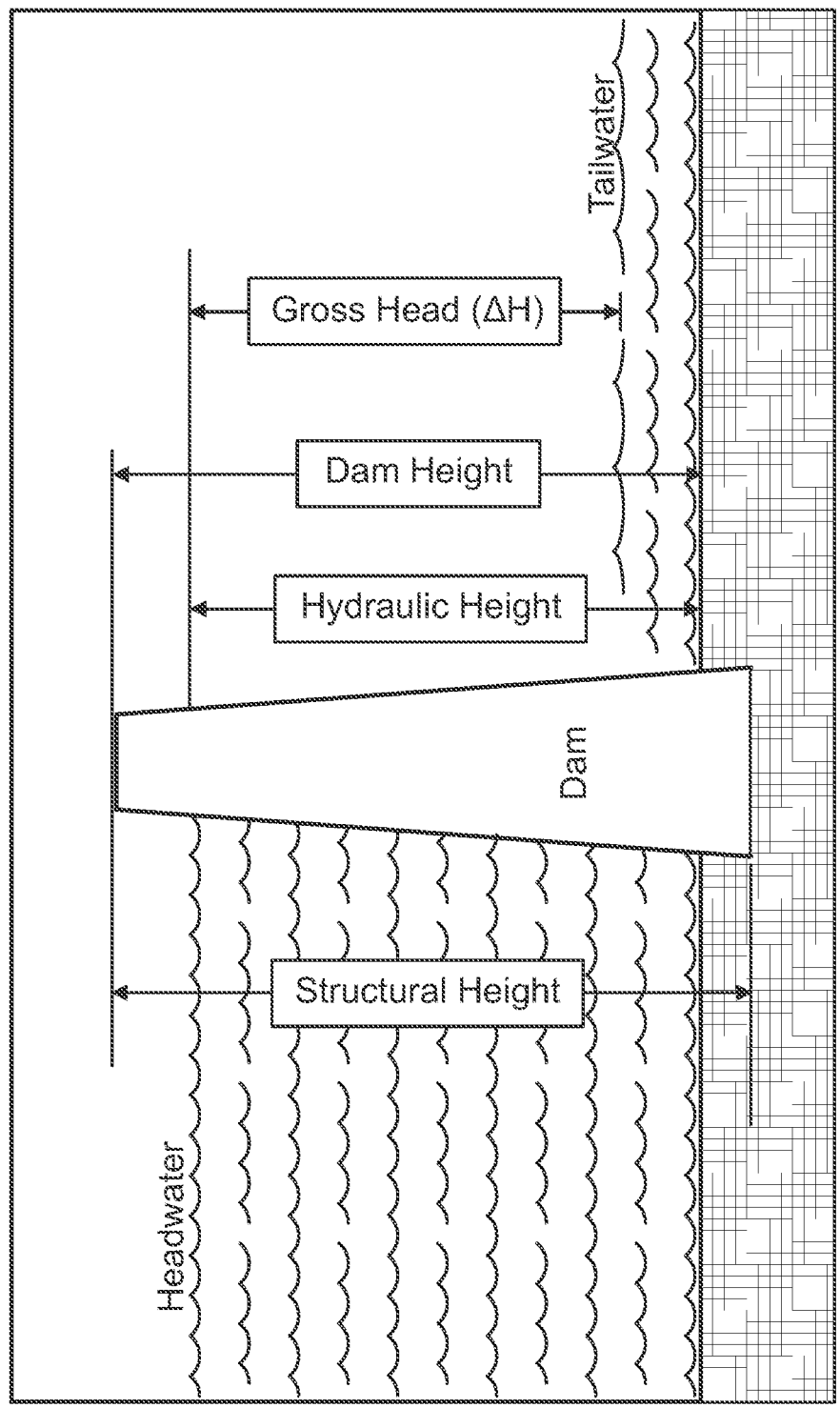
FIG. 13 is a cross-section of a dam which depicts the location between a headwater and the tailwater location.

Referring now to FIG. 13 a cross-section of a dam is shown which depicts the location between the Headwater and the Tailwater. Headwater is usually at a higher elevation than the tailwater. All types of pressure vessels described in this application could be used for an apparatus invention used in conjunction with a dam. Additionally, the pressure vessels including an air driven piston head and others which does not use a piston head can be used. Many types of existing dams could be used for re-circulating and non-recirculating applications as referenced in this application.

When economically, environmentally or for other reasons beneficially useful, the apparatus invention could be designed to have the Hydro-turbine discharge back into the headwater side of the dam versus the tail water side of the dam. This approach would allow for recirculating the water flow media.

Having the ability to use a recirculating application versus a non-recirculating method for dams could be useful in geographical regions where water is in short supply and the reuse of the water could be both economically and environmentally beneficial. This application could also be useful when the apparatus invention in this application is used in conjunction with the CCR or other types of pumped hydro storage structure in a recirculating water source fashion.

When water is plentiful and does not need to be recirculated, the non-recirculating type application can be used as described in U.S. patent application Ser. No. 16/383,894 and can also be used with all the piston types as described in this application.

In other formulations and applications, it may be useful to construct man-made structures to recirculate the liquid portion of the media flow. Many different types of structures could be used including steel pressure vessels, concrete structures and other known construction means, method and materials for the construction of recirculating capabilities.

The size and scale of the apparatus invention in the application can range from very large to very small. With the use of man-made structures for recirculation of water and other media flow as described below, the apparatus invention could be sized and engineered to work for residential and businesses, in addition to energy storage for the electrical grid. Residential and business uses could also use existing water sources in a recirculating or non-recirculating application in lieu of man-made recirculating structures if the conditions warrant this approach.

Hydro-turbines are divided into two main categories. One category is impulse turbines and the other is reaction turbines. Several factors will be considered upon which turbines are to be used, but two of the factors that will be considered in every application will be the flow rate and pressure of the water in the apparatus invention operating system. Different type turbines have different efficiency ratings for different water head pressures and flow rates.

One factor in determining the economic feasibility of using the invention of this application is designing and constructing a cost efficient compressed air storage volume where its efficiency is determined by the cost per cubic foot of net usable air that is available to operate the system during energy production requirement time frames, along with the long-term life cycle cost.

The method used in the large-scale compressed air energy storage system (CAES) in McIntosh, Ala. is an underground salt-dome cavern. Underground salt-dome cavern storage in the United States is predominately used for natural gas and other fossil fuel products.

Underground storage methods consist of using many different geotechnical formations including Salt Caverns, Mines, Aquifers, Depleted Reservoirs and Hard-Rock caverns.

The methods described by the EIA Energy Information Administration are options, and in some instances, can be the best options for the use of the apparatus invention included in this application. It is relevant to note that the CAES in McIntosh, Ala. uses a adiabatic compression approach which can also be used in this application's apparatus invention system in certain applications, but will not be used in all applications and will not be used in the same application as McIntosh, Alabama's CAES facility, as discussed further below. The reason the type of compression that is used is relevant is that the McIntosh, Ala. system requires the compressed air leaving the underground cavern to be heated with natural gas before entering the turbine to reach the design energy production requirements. The compressed air for the apparatus invention in this application will have its air cooled in most applications, but the system in this application does not require the compressed air to be heated once leaving the storage volume to function properly. There may be economic reasons to heat the compressed air while it is still in the storage volume or upon the air leaving the storage volume for use in the apparatus invention in this application that are addressed below, but this added heat is not a necessity to operate the system as it is in McIntosh, Ala.

Another method of storing compressed air in either a liquid or gaseous state is to weld or mechanically couple steel pipes together to create a storage volume. The thicker the pipe the greater pressure the pipe can withstand. In design for decades-long continuous use, the pressure rating of the pipe is decreased to consider the cyclic forces of compressing the air and the releasing the air on a frequent basis. When pipes are placed in materials that help restrain their expansion behavior during the air compression and storage cycle, the allowed design pressure, and therefore the amount of stored compressed air, can be increased. The steel pipes can be coated inside and outside to protect against corrosion. In addition to what is described in this application, other types of metallic and non-metallic pipes, composite pipes, different materials and/or different shapes can also be used for the creation of compressed air energy storage volume in the approaches outlined in this application.

Included in this application are several novel approaches to cost effectively store the compressed air.

One novel approach is to beneficially use Coal Combustion Residuals (CCR) in which to place the storage volume pipe. The CCR can be strengthened through various known construction methods to create a CCR mix design that can restrain the expansion pressures when the pipes are being filled with compressed air. The increased strength of the CCR can allow for thinner walled pipes to be used and/or for greater air pressure to be placed into the same given diameter of pipe, thus allowing the pipe to have greater storage capacity and a less expensive cost per cubic foot of air storage. The pipe can be sloped to allow for a method to remove any moisture which may accumulate in the pipe over time.

Figure 14:
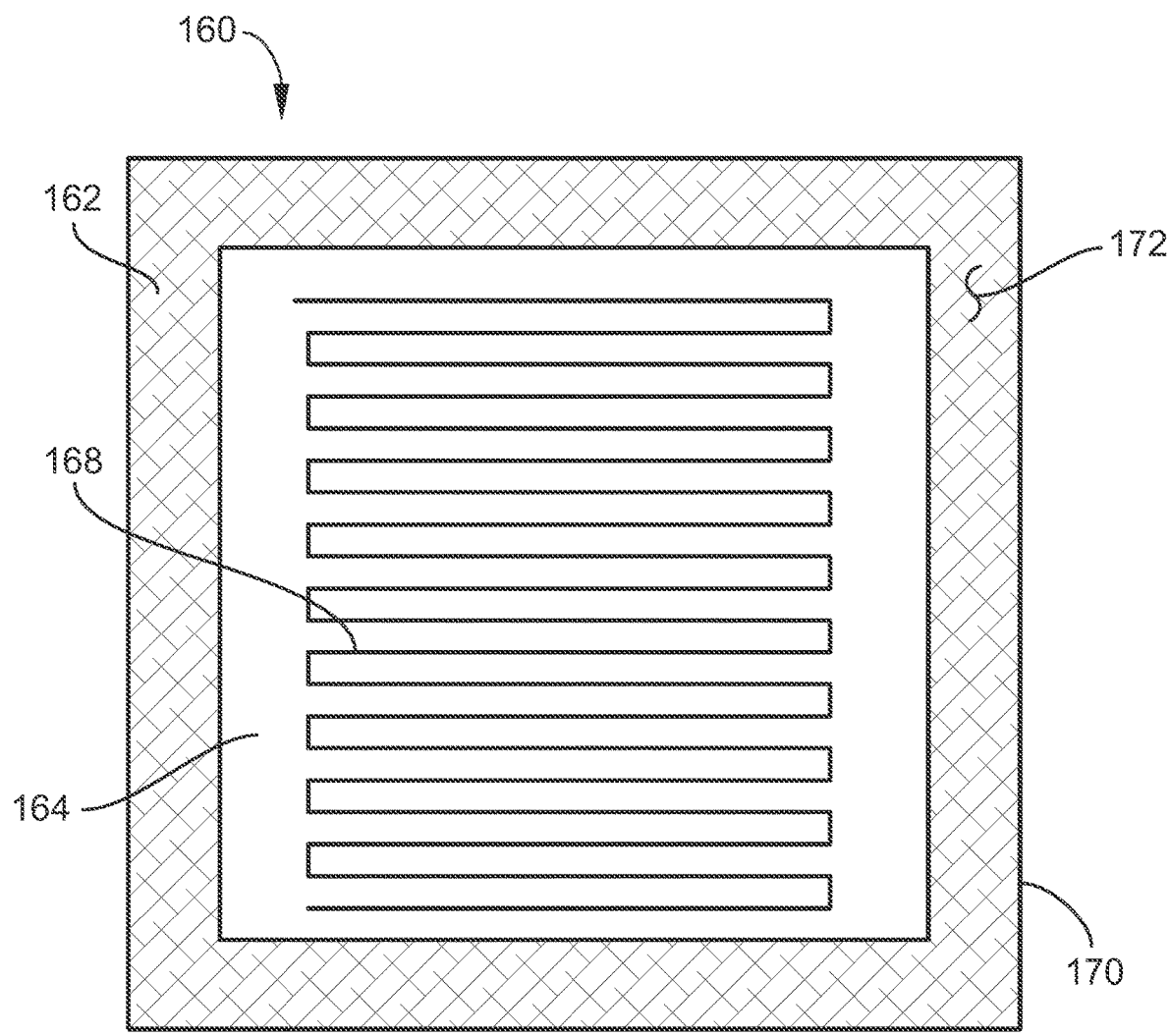
FIG. 14 is a plan view of a CCR static structure which contains a piping system for compressed air energy storage.
Figure 15:
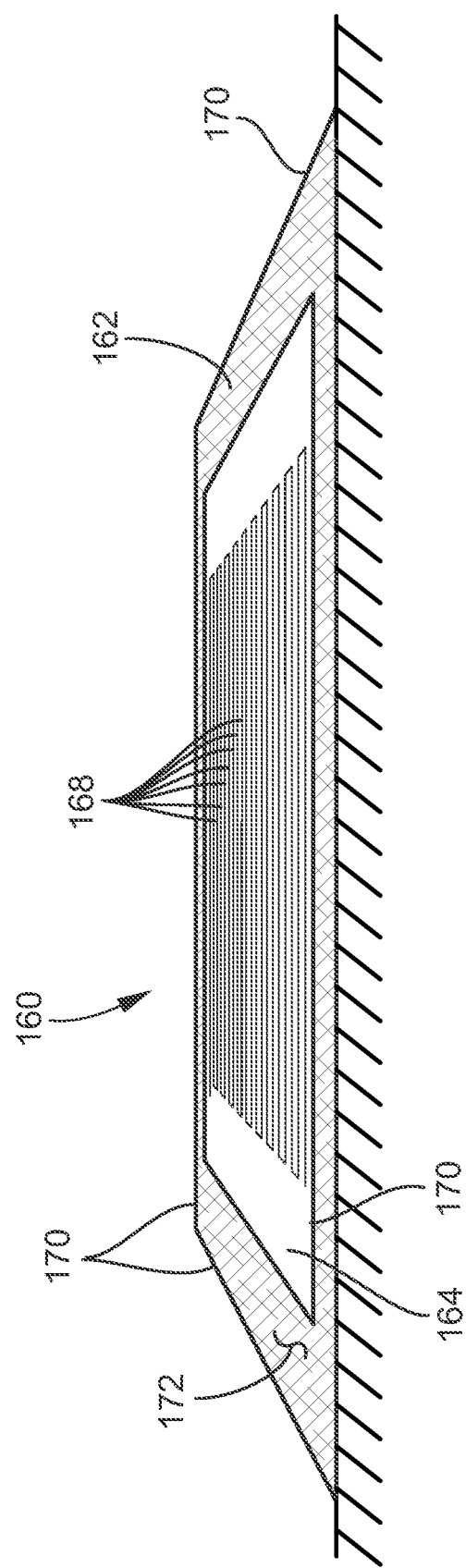
FIG. 15 is a vertical cross-section of FIG. 14.

FIGS. 14 and 15 show plan and vertical cross-section views of a static structure 160 that has reinforced CCR sloped walls 162 within which an enclosure encapsulated CCR-surrounded enclosure 164 is formed which contains a circuitous piping system 168 for storing large quantities of compressed air. A liner system 170 covers all surfaces of the structure 160, and, optionally, a vegetative cover 172 can be placed over the liner system 170. The CCR can be strengthened with a mix design that has many different known ingredients including cement, lime and other known commercially available admixtures, or it can be unmodified compacted CCR. Class C coal ash has natural compressive and tensile strength after water is added to it to create a chemical reaction.

There are many design layouts and configurations that the piping system can use. One method is to allow for separate storage areas, or storage areas that are connected to a common manifold system with operating valves that can be open or closed to allow for the refilling of the particular portion of the storage volume while the apparatus invention is operating for energy production so as to allow for the refilling of the storage volume with air by either using a parasitic load from the energy created during operation of the apparatus invention or from other energy sources. Using parasitic energy will decrease the net energy produced but it may be financially advantageous to be able to create a less voluminous and less costly compressed air storage system. Allowing the storage volume to be separated into distinct divisions will allow for the air pressure in a storage division to be taken to the low-pressure design point before refilling starts, which requires less energy to push against lower pressure than higher pressure making the refilling process more economical. The financial analysis will be performed on a case by case basis considering the construction cost and the price value of the energy required during peak energy price time frames versus the price of energy required to refill a portion of the storage area less the construction cost of the decreased storage volume for the same time duration required for energy production.

The CCR static structure for CAES storage volume can be designed and used in conjunction with the Pumped Hydro structure as shown in FIG. 11 and FIG. 12 to increase the beneficial use of the CCR. Pressure vessels and penstocks can also be placed in the CCR area or the pumped storage water area, or the pressure vessels and penstock(s) can be placed in other designed locations on, in, next to, above or below the compressed air storage piping and pumped water storage areas.

Another novel approach is to design and construct a composite hybrid compressed air storage volume that can use many different designs with many different known construction materials and construction means and methods. Some of the many different types of construction materials that can be used include, but not limited to, are concrete, strengthened CCR, steel, reinforcing bars, tie-bars for sheet piling, post-tensioning, sheet piling, composite steel and concrete panels, steel piping, fiberglass piping, composite piping, HPDE piping and many other known materials. Construction means and methods include many known construction techniques, but one method known as soil/ground improvement is particularly relevant to this approach. There are many different types of soil/ground improvement methods of which some are cutting soil mixing, soil mixing multi axis, soil mixing single axis, vibro systems and jet grouting.

Figure 16:
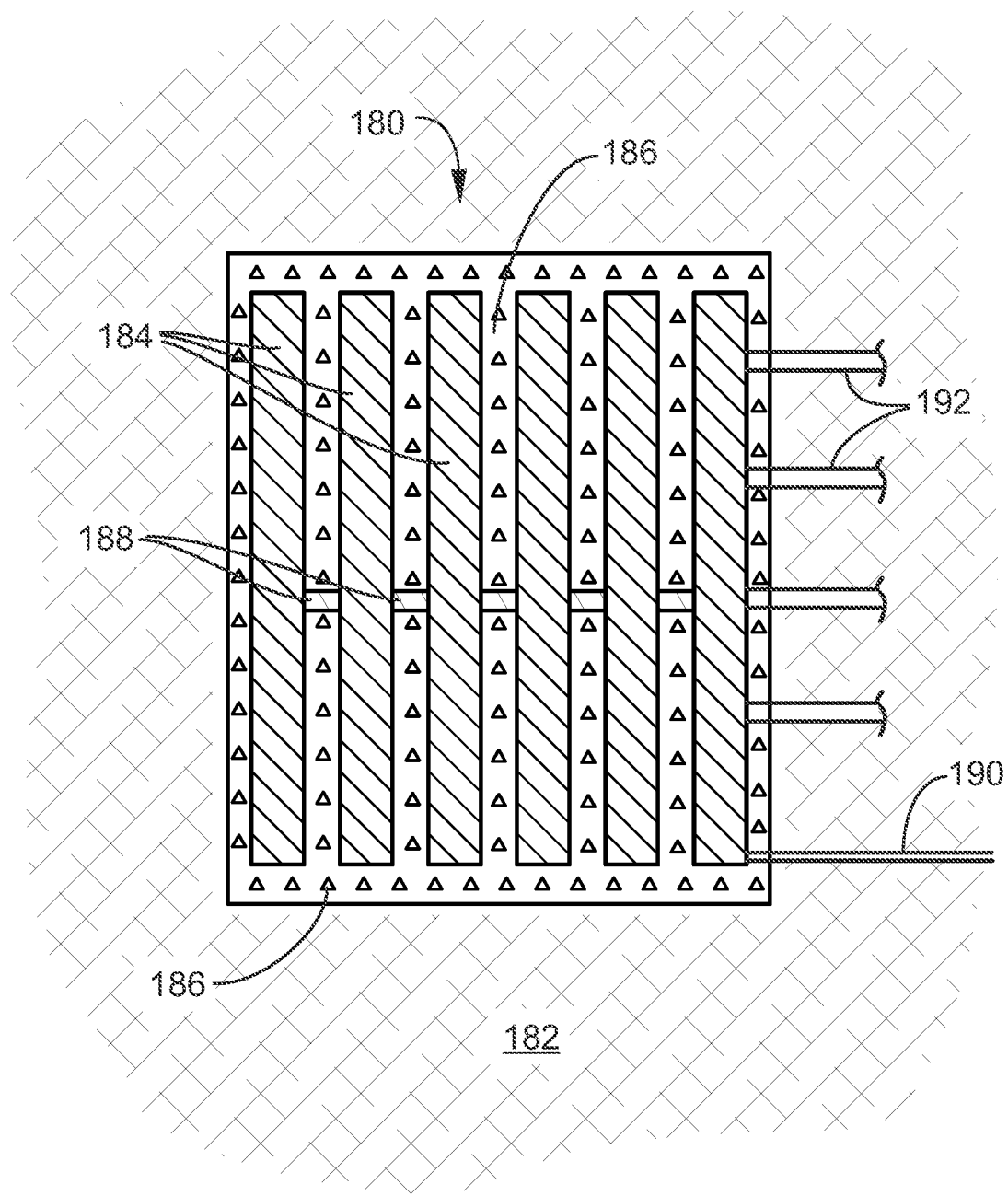
FIG. 16 is plan view of a system exemplary of many possible designs of the composite storage volume for compressed air that is principally constructed below ground.

FIG. 16 shows the top plan view of a compressed air storage facility 180 constructed largely below ground level and capable of retaining and distributing a high volume of compressed air in either a liquid or gaseous state. Facility 180 may be constructed of sheet pilings driven into the ground in an arrangement defining the perimeter of the facility 180. The ground on the exterior side of the facility 180 will have deep soil mixing ground improvement 182 to give support for the sheet pilings when the compressed air is pumped into storage pipes 184. The storage pipes are encased in poured-in-place concrete 186 including concrete reinforcement bars, and/or tie rods for structural strength and stability. Pipes 184 can be interconnected with other pipes 188 which may have valves to separate the pipes into separate storage areas. The pipes 184 and 188 may have a slope to allow any moisture in the pipes 184 and 186 to run to a drainpipe 190. High pressure pipes 192 will take the air to a regulator for distribution to an air manifold system and/or the pressure vessels, as described above.

Figure 17:
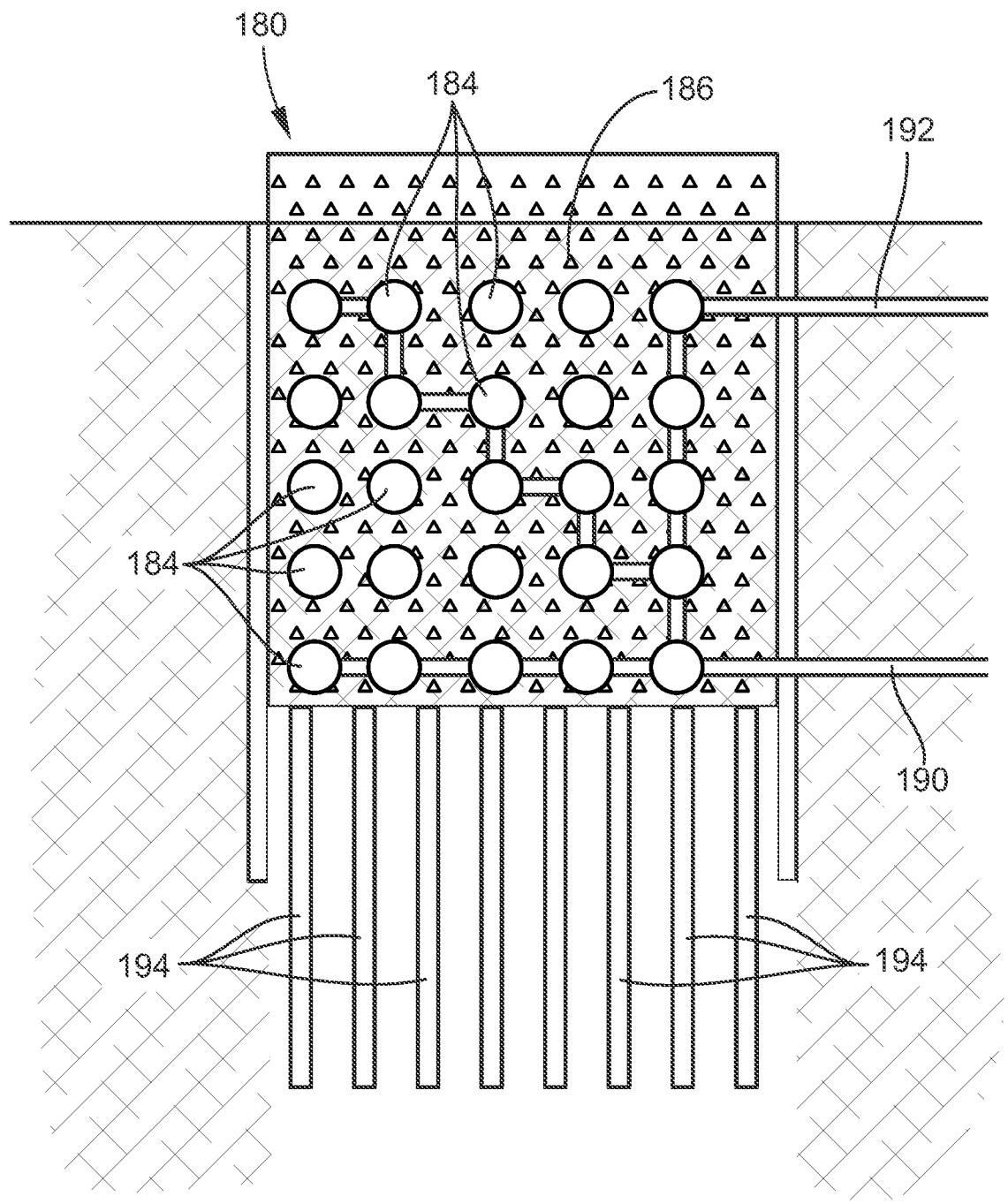
FIG. 17 is a cross-section of FIG. 18 and including deep foundations.

Referring to FIG. 17, a vertical cross-section of FIG. 16 is shown with the addition of deep foundation elements, for example reinforced concrete pilings 194 as an option based on geotechnical site conditions. Fortified CCR may be beneficially used as a buttress to the concrete 186 without sheet piling and can be constructed above existing grade.

Another novel approach is to use of HDPE piping in combination with an inflatable air-tight liner system that will expand and deflate inside of the piping. HDPE piping comes in many different sizes which allows for flexibility of design and use. The HDPE piping can add protection for the expandable and collapsible liner system in addition to working as a composite system for increased strength of the storage volume. The inflatable liner can be made of many different types of products, one of which is the inflatable and collapsible type air bags used for ship salvage, for example, products manufactured by Blue Ocean Tackle. Another type of liner that could be used is the inflatable and collapsible rubber dams manufactured by Dryhoff. The composite system of HPDE piping and the air-tight inflatable and collapsible liner will be designed so that when the maximum amount of the pressurized air is applied, the safe working limits of both the linear and the pipe's restraining features are efficiently used in conjunction with each other. This system can be used above or below water and it can also be used above or below ground. When the system is used, specifically engineered sizing and spacing of holes with the option of protective screen material will be manufactured into the pipe to remove any suction or vacuum effects of the liner's deflating capabilities when air is exiting the storage system. When the system is used underwater, piping with engineered holes and protective screening material can use water and air pressure to reduce the suction effects of the interaction of the liner and piping whereas to reduce the vacuum on the interaction of the liner and piping when the compressed air is exiting the system for use in the operation of the invention apparatus of this application. HPDE piping is commonly towed by watercraft and can be used on sea beds as part of a triple HDPE piping system. HDPE piping can be produced and used in large sizes to allow for personnel inspection and maintenance inside of the pipes. Underwater pipes can also have engineered holes with predetermined sizing and spacing that will allow water into the pipe when the liner is being deflated, and which will allow for the water to be pushed out when the liners are re-inflated.

Figure 18:
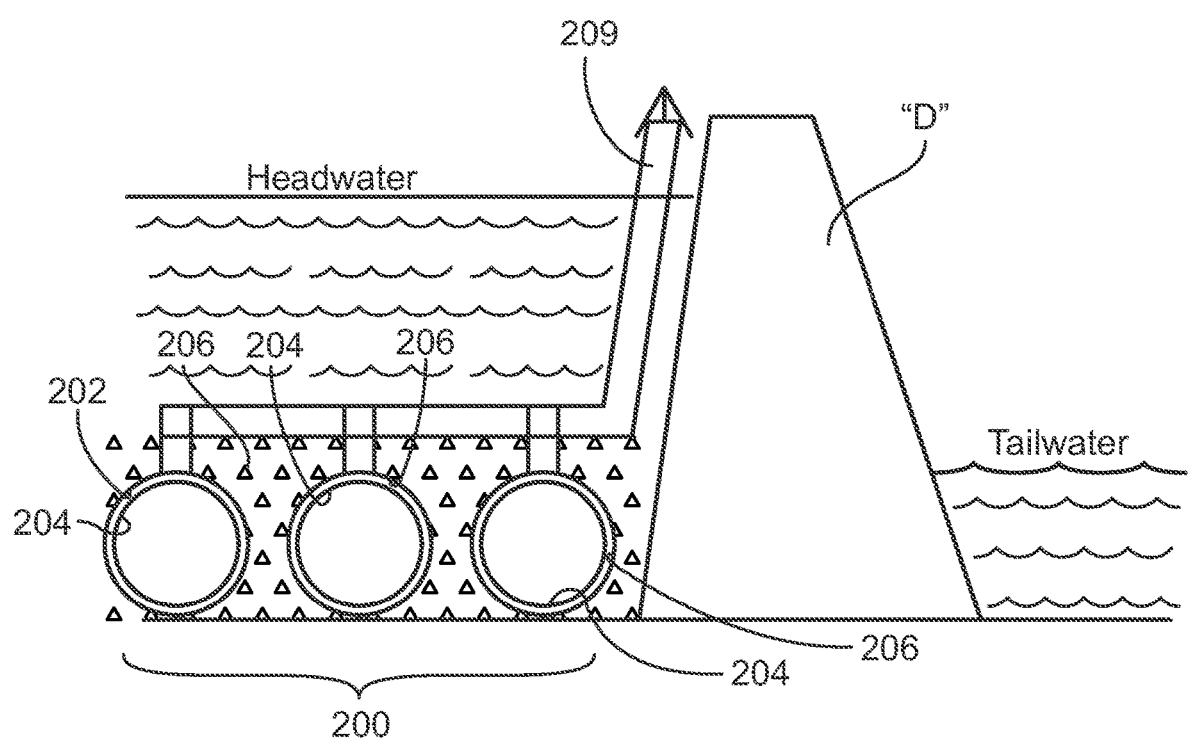
FIG. 18 is cross-section of a triple tube HDPE and air-tight inflatable liner system across the headwater side of a dam.

The novel pipe and liner system could be used in many applications and in many sizes. As shown in FIG. 18, an air-tight inflatable liner system 200 across the headwater side of a dam "D" includes three HDPE pipes 202 within which are positioned respective inflatable liners 204. This system 200 can be ballasted with rocks 206 and/or attached to the riverbed or lakebed to secure it in location. The system could also be attached horizontally and/or vertically to the headwater or tailwater side of the dam "D". Air is exhausted through an air vent pipe 209.

The compressed air energy storage volumes described in this application can be designed to have a volume that will allow for the apparatus invention in this application to run for a specific time period with the storage volume being one connected volume, or the storage system can be designed to have specific and distinct storage areas that will be used sequentially and as one area is depleted with pressurized air, an air compressor can use a parasitic load from the energy produced from this system to start refilling the pressurized storage area once the pressure inside of the storage volume decreases to a predetermined level. Other forms of energy in lieu of parasitic load can be used including electricity from the grid and/or renewable energy sources.

Another option is to increase the temperature of the compressed air, whether in a liquid or gaseous state, with heat from fossil fuel gases at many different stages of the air flow process to increase the air's temperature which will increase the pressure of the air. The method used in McIntosh, Ala. for heating the air before it enters the turbo expander is the same type of method that could be used for this invention's pressurized air before entering the pistons, conduits or pressure vessels with the understanding that the temperature would be a lower temperature than used in McIntosh, Ala. so as to not cause the water in the pressure vessels, conduits or pistons to boil, but at the same time increasing the pressure of the air thereby decreasing the overall required compressed air energy storage volume.

Another option would be that during the operation of the apparatus invention and when the air pressure inside the storage volume reaches a predetermined level, heat the compressed air which have not be cooled down after the rise in temperature produced from the heat of compression could be pumped back into the compressed air energy storage volume. With the known engineering principle that Pressure=Volume*Temperature (P=V*T), if the remaining air inside the storage volume has its temperature increased, then more working capacity of the system would be created by the increased pressure.

There are many different manufacturers and types of air compressors. Some of the major manufacturers of air compressors are: Man Turbomachinery, Atlas Copco, Siemens Dresser Rand, Ingersoll Rand, Solar Turbine, and Sullair.

The type and size of compressor(s) that will be selected depends on several engineering factors some of which include: the air pressure requirements, the time required to fill the storage volume, the air flow required for a given time frame, temperature of the compressed air, the moisture content of the compressed air, the efficiency of the system, and the total life cycle cost. Some air compressor systems may use a different air compressor to a required pressure level and then another air compressor to increase the air pressure to a higher-pressure level.

The temperature of air is increased as air is compressed. Inter-cooling capabilities can be used to decrease the temperature of the air, or a heat exchanger as described below could be used in some applications.

Air compression systems can also use different methods to remove moisture out of the compressed air.

Pneumatic cylinder pistons and hydro-pneumatic cylinder pistons can be used as the main piston for the apparatus invention in this application or they can be used as the piston(s) for the reuse of piston air as described below. These pistons can also use a parasitic load to run a hydraulic pump to increase the pressure with fluids if required.

The use of these types of cylinders will allow for an efficient use of the pressurized air and with the known physics principle of force equals pressure times area (F=P*A), if the size of the area the pressurized air interacts with the flow media is doubled, then half the air pressure is required for the same amount of force which is exerted against the liquid. This formulation and application can be useful for the reuse of air from pistons as described below, and it can also be useful for when the compressed air volume storage has decreased in pressure during the energy production period to keep operation of the apparatus invention continuing at a lower working air pressure.

When the pressurized air in the pistons have completed forcing the water in the pressure vessels to the penstock and as the water outflow valves are closing, the computer controls will be simultaneously opening the air release valves so that no water-hammer effect will be incurred. The remaining pressurized air in the system could be exhausted into the atmosphere and its remaining useable compressed air energy would be wasted and unusable after it is exhausted to the atmosphere.

With the compressed air energy of the pressurized air remaining in the piston still containing energy after the water in the pistons is forced into the penstock, there are several applications to reuse this pressurized air for economic benefit and for the overall increased energy production and cost efficiency of the system.

One application of the reuse of pressurized exhausted air would be to construct a separate apparatus invention adjacent to the apparatus invention that uses the first round of the pressurized air's energy. Without the addition of other forms of additional energy, this system would be smaller in size and produce less energy but could still be cost effective to construct. The pressurized air can be supplemented with other forms of energy as necessary.

Another application of the reuse of pressurized exhausted air would be to use the exhausted air which pushes water as the method used in a concrete pump to recirculate water which has exited the hydroelectric turbine at a lower elevation and recirculated the water back to the higher elevation for reuse. This could be economically beneficial when used in a water recirculating application as described above.

Another application of the reuse of pressurized exhausted air would be to use the exhausted air pressure to turn a turbo expander to generate electricity. Atlas Copco is one manufacture that makes this type of equipment. The turbo expander could drive an electrical generator or a water pump to recirculate water back to a higher elevation for reuse.

Another application of the reuse of pressurized exhausted air would be to use the exhausted air with the engineering principle of Force Equals Pressure Times Area (F=P*A).

One of the major cost components of the invention in this application is the cost of the pressure vessels that force water under pressure into the penstock(s) or directly into the hydro-turbine. Hydro-electric turbines and their related electrical equipment can be designed to have non-pulsating water flows which use synchronous electrical generators, or they can be designed for pulsating water flows which use asynchronous generators. Asynchronous generators and related electrical balancing equipment are more costly to construct.

One of the uses of a compressed air energy storage system (CAES) is to have a fast response time for electrical energy production for the use in stabilization of the grid for voltage and electrical current which allows for the electrical grid system to stay within the required ranges of allowable voltage and wattage.

Figure 19:
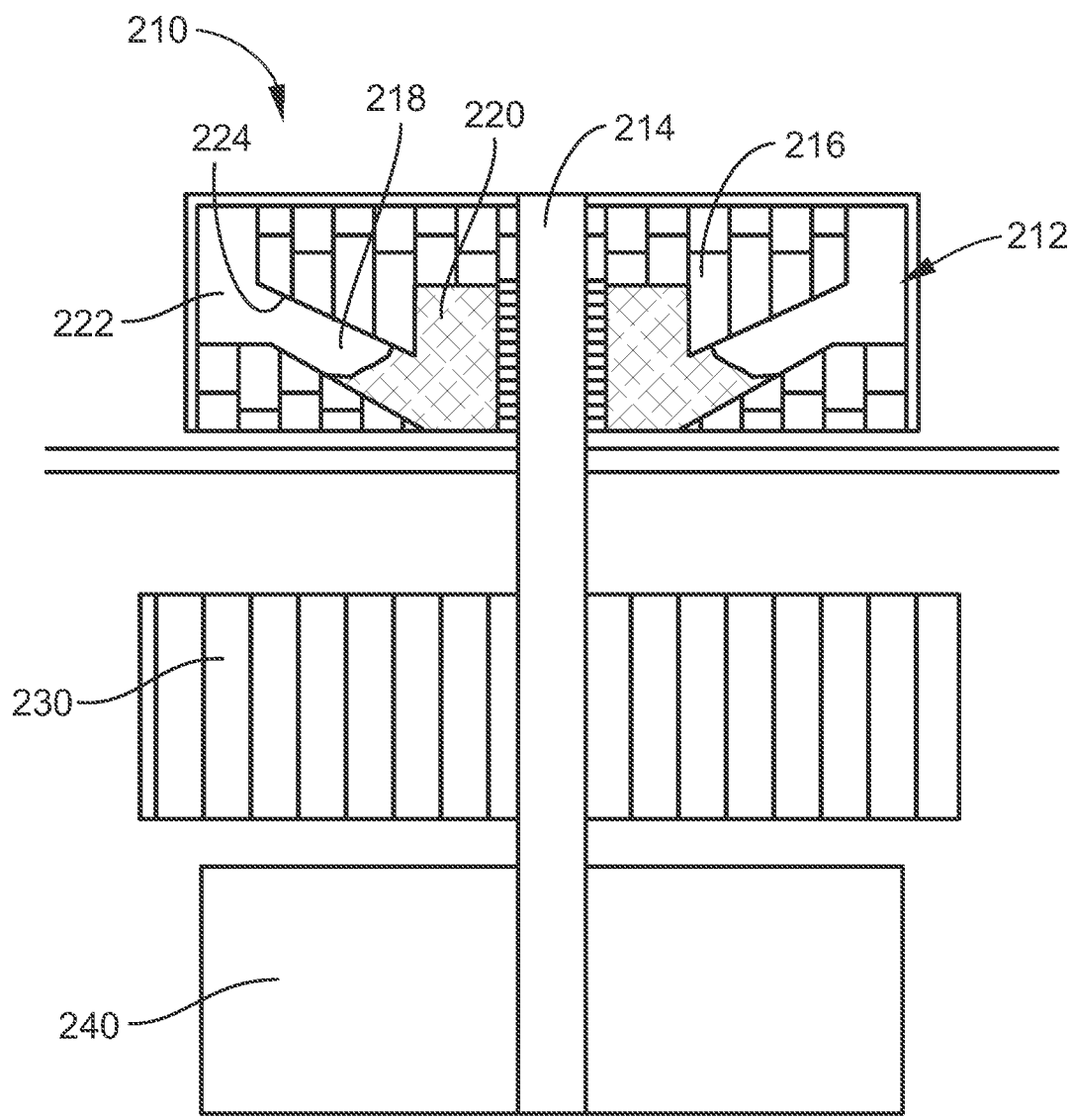
FIG. 19 is a cross-section of a flywheel designed for a liquid to be placed in an enclosed volume that is partially filled with a low viscosity liquid.

FIG. 19 shows a cross-section of a hydro-turbine/generator 210 that utilizes a steel flywheel 212 for increasing the efficiency of the hydro-turbine generator 210. The flywheel 212 includes a drive shaft 214 around which are fixed for rotation with the drive shaft 214 an annular wheel housing 216. A liquid compartment 218 is formed in the wheel housing 216. The liquid compartment 218 includes a central chamber 220 and a peripheral chamber 222 interconnected for centrifugally induced liquid flow by a passageway 224. A generator 230 and a turbine 240 are fixed for rotation on the drive shaft 214 with the flywheel 210.

The enclosed volume of the compartment 218 is partially filled with a low viscosity liquid such as water. The liquid will move outward and upward by centrifugal force once the rotation of the flywheel 210 begins.

With the use of a this flywheel 210 specifically design to work with the turbine 240, the required piston volume can be decreased when used in conjunction with the flywheel 210 to keep the hydro-turbine 240 running in a non-pulsating fashion and at the same time allowing for reduced piston volume working in a non-continuous water flow application. In addition, the flywheel 210 will also allow for a faster start-up time when compared to a traditional flywheel.

The specialized flywheel 210 is designed to require less torque to start the angular acceleration of the hydro-turbine/generator 210, but once the flywheel 210 starts to turn, the liquid in the flywheel 210 will move outward and upward which will give the system greater momentum. With one design option being one compartment for all 360 degrees of the flywheel 210, the liquid will be evenly displaced outwardly around the perimeter of the flywheel 210 which will keep the flywheel 210 balanced when the liquid is in the lower or higher sections of the liquid compartment 218. The flywheel 210 can be designed to function in a non-continuous water flow to the hydro-turbine 240 and this design feature can allow for a smaller piston or pressure vessels volume. With the increased rotational inertia created by the forces of the flywheel's liquid being forced to the perimeter once rotation starts, the flywheel 210 will allow for the drive shaft 214 to spin within the required RPMs range for the appropriate amount of time to allow for the next supply of non-continuous water to reach the hydro-turbine 240. The slope of enclosed volume for the liquid containing compartment will be designed to keep the water in the an peripheral chamber 222 while pistons are alternating in their functions from water refilling to water outflow in a non-continuous water supply application. See FIGS. 1-6, for example for types of pressure vessels to be used in this application. Once the energy production time has come to an end, the liquid will move to the central chamber 220 of the flywheel 210 by gravitational pull, which will allow for a faster start-up time for the next energy production time frame.

Figure 20:
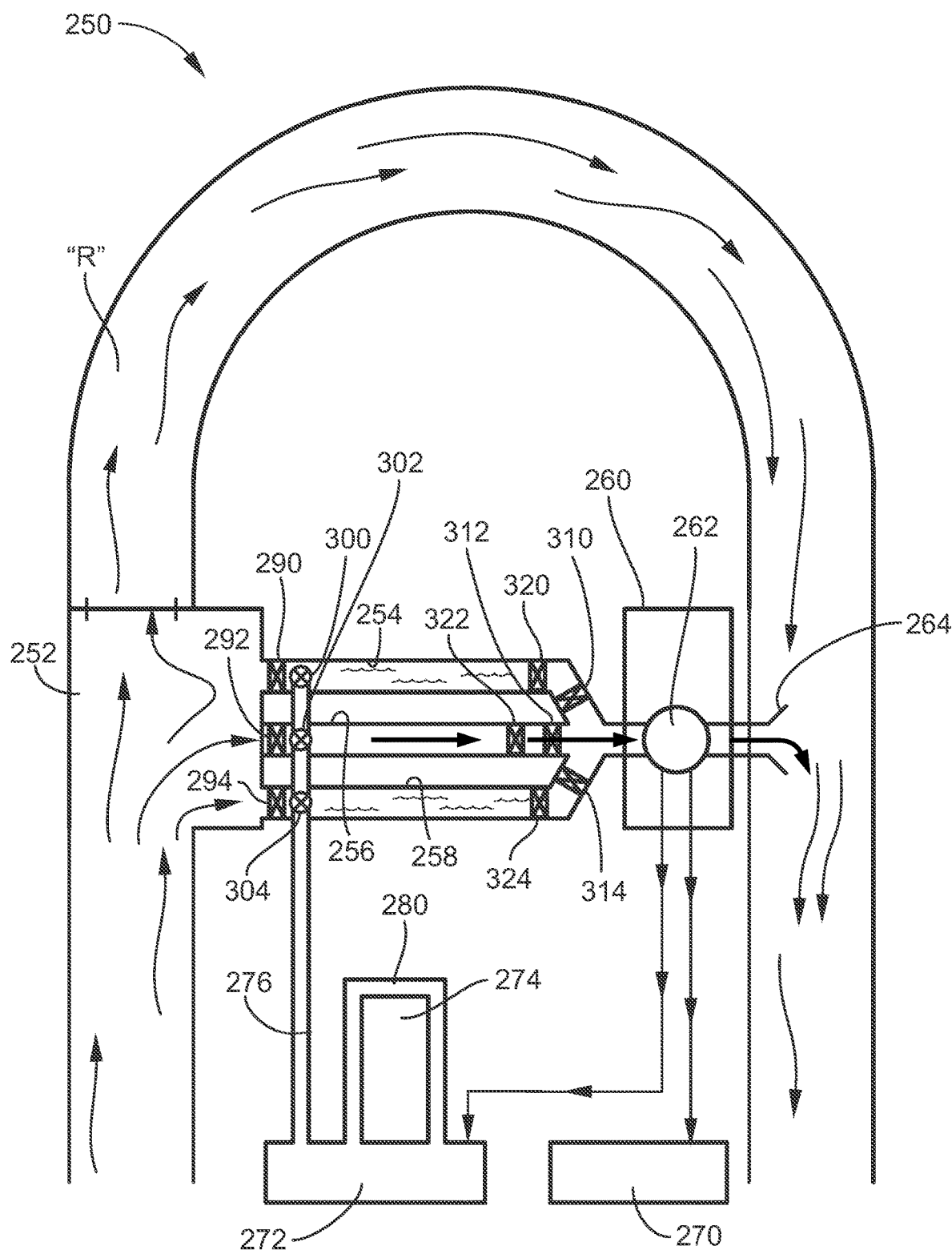
FIG. 20 is a schematic plan view of a facility for generating electricity using a combination of water and a gas, such as air.

Referring now to FIG. 20, a facility 250 for generating electricity according to one embodiment utilizing the techniques described above is shown in FIG. 20. The facility 250 may be sited in, for example, a horseshoe bend in a river "R," a manmade channel, canal, downstream of a dam or fed by an upstream impoundment. As shown in the drawings, the river R has a gravity-induced flow indicated by arrows in the streambed. As water flows past the upstream side of the facility 250, water in the disclosed embodiment is diverted by an intake 252 into three penstocks 254, 256 and 258 that deliver the water under pressure in an alternating sequence to a power house 260 in which is housed a turbine generator 262. The water exits the power house 260 through an outlet 264 and flows back into the river R where it joins the water in the river R and flows downstream. As noted above, this is only one of several means by which water is supplied to the power house 260.

Electricity generated in the power house 260 is delivered during peak loads to a power grid 270 for use by customers or during off peak load times to an electrically-powered air compressor 272 that takes environmental air, pressurizes it and stores it in a compressed air storage reservoir 274. The air compressor 272 may include the necessary components and functions to carry out the initial compression of air into a liquid state, as described above, and the reservoir 274 may include the necessary components and functions to allow expansion of the liquid air into a gaseous state in a manner allowing it to be used as an energy-producing medium as described in this application.

An outlet 276 from the reservoir 274 delivers pressurized air to the penstocks 254, 256 and 258 as described below. As needed, power can be scavenged from the grid 270 to generate further compressed air depending on the level of power usage and the availability of excess power from the grid.

Preferably, the facility 250, or parts thereof such as the air storage reservoir 274 are encased in, for example, a structure of earth or a mixture of coal combustion residue ("CCR") and other materials 280 to efficiently protect the facility 250 from environmental effects, whether caused by natural or manmade events. The use of CCR is a beneficial use that provides a means of efficiently utilizing an otherwise unusable waste material of which there presently exists many millions of tons.

The flow of water and compressed air to and from the penstocks 254, 256 and 258 is controlled by valves. Water inflow valves 290, 292 and 294 are controlled to selectively allow water to flow into the penstocks 254, 256 and 258, respectively, from the intake 252. Compressed air inflow valves 300, 302, 304 are controlled to selectively allow compressed air to flow from the air storage reservoir 274 into the penstocks 254, 256 and 258. Water outflow valves 310, 312, 314 are controlled to selectively allow water to flow out of the penstocks 254, 256 and 258, respectively, to the turbine 262.

Air pressure release valves 320, 322, 324 positioned upstream of the water outflow valves 310, 312, 314 allow air pressure to be released from the penstocks as needed sequentially as water is forced under pressure downstream from the water inflow valves 290, 292 and 294.

The sequencing and operation of the facility is controlled by suitable software that is programmed to monitor operation of the facility 250 and open and close valves according the description of this application. Power may be distributed to an electrical power grid or to an air compressor for generating compressed air for powering the facility.

Referring now to FIGS. 21-26, CCR structures are illustrated in use with liquefied air structures.

Figure 21:
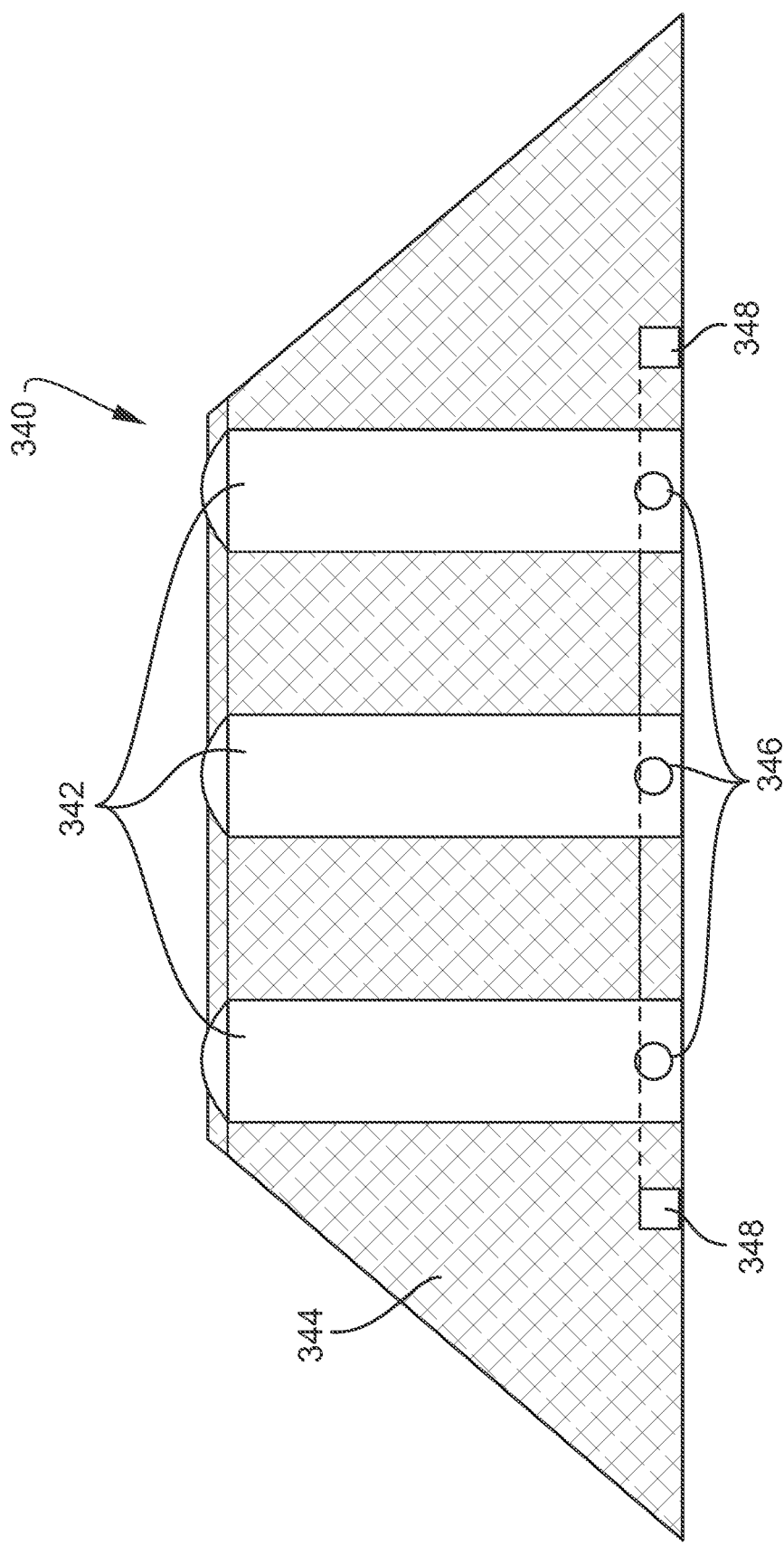
FIG. 21 is an elevation view of a CCR insulated liquid air storage facility.
Figure 22:
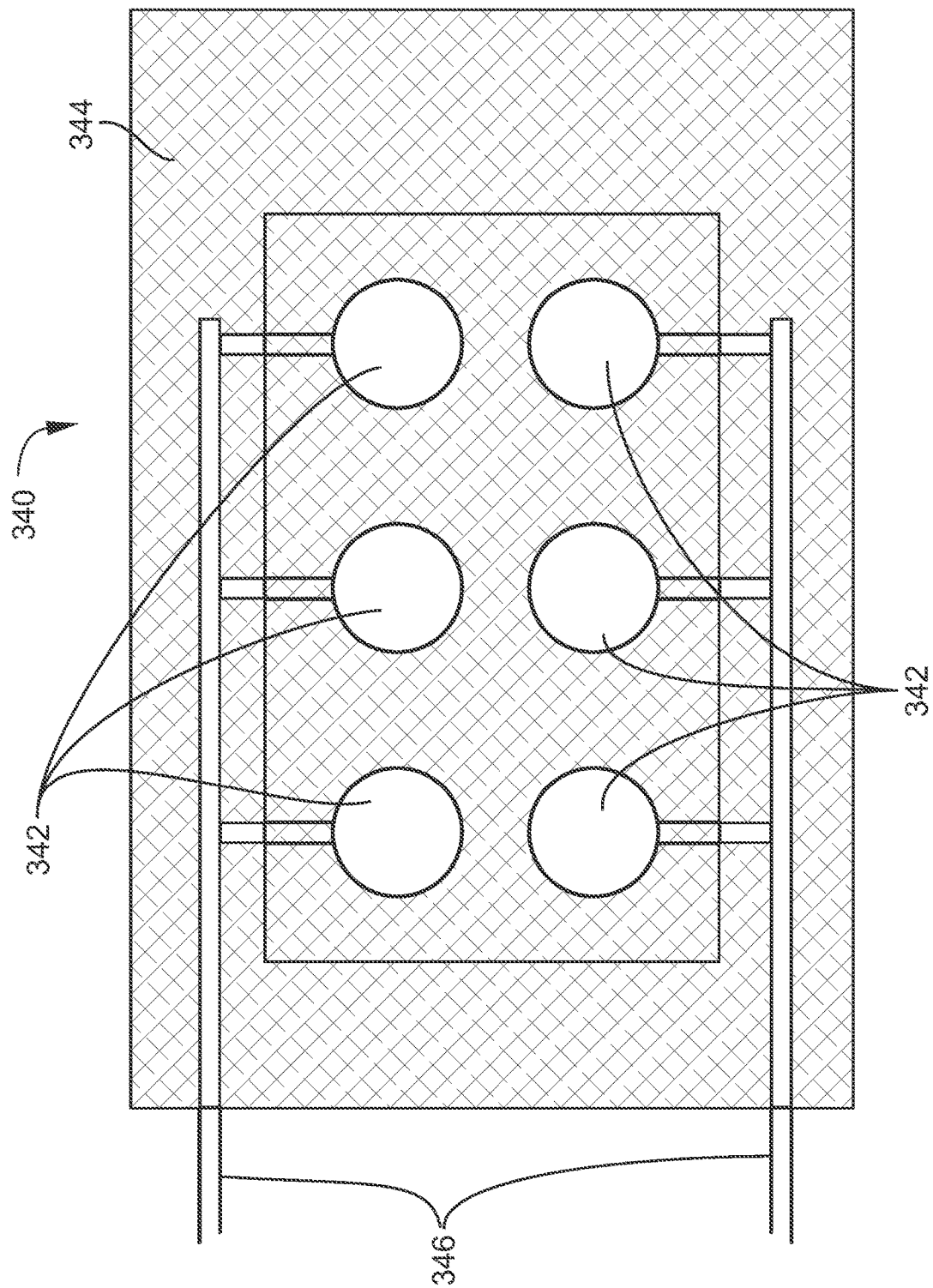
FIG. 22 is a top plan view of the CCR insulated liquid air storage facility of FIG. 21.

FIGS. 21 and 22 illustrate a liquefied air storage facility 340 insulated with CCR. Cryogenic storage tanks 342 are contained in a large volume of CCR 344, which has inherent insulating qualities due to the surface condition of the CCR 344 and the amount of air trapped in the interstices between the very small individual CCR particles. No matter how efficient the insulating qualities of the CCR 344 or any other insulating material, some degree of cryogenic activity to maintain the liquid air at the required temperature must be supplied to prevent the liquefied air from eventually moving to a gaseous state with a very large increase in pressure. Liquefied air can be conveyed from the storage tanks 342 under controlled pressure through pipes 346 and associated valves as described above, allowing the liquid air to transition to its gaseous state in preparation for its use as a high pressure energy source for electricity generation. As shown in FIG. 21, drains 348 carry away condensation or other liquids present in the facility.

As is well known, when air is compressed, heat is produced and when the air is allowed or forced to expand cooling results. For the most efficient system, both the heat generated by compression and the and cooling generated by the expansion should be able to be stored and reused at some point in the process. The cold storage would be used to reduce the temperature of compressed air, and the heat would be used to heat the air upon its expansion. With the use of liquid air the CCR structures can be used together with excess energy off the grid to provide for insulated structures to store heat and cold.

When heat is produced incident to production of liquefied air, the heat generated is stored and later used to reheat the air before it enters the pressurized hydro's pressure vessels as described above.

When cooling results during liquid air or compressed air expansion, the cooled air is stored and reused when compressing the air in the recharge cycles to make the process of making liquid air or compressed air more efficient.

Referring now to FIGS. 23-26, CCR can be beneficially used in both activities. In addition to CCR providing insulation value to keep maintain stable temperature, CCR can also be a mechanism to pay for a portion of the pressurized hydro system including energy store, energy exchanges, and air tanks. During the charging/energy storing phase, excess power can be taken from the grid to heat and cool material through other known processes to heat and cool materials for greater efficiency of the charging, storing and electrical generation phases. This is in addition of storing the heat of compression or the cooling from expansion in the liquified air production or electrical generation process.

Figure 23:
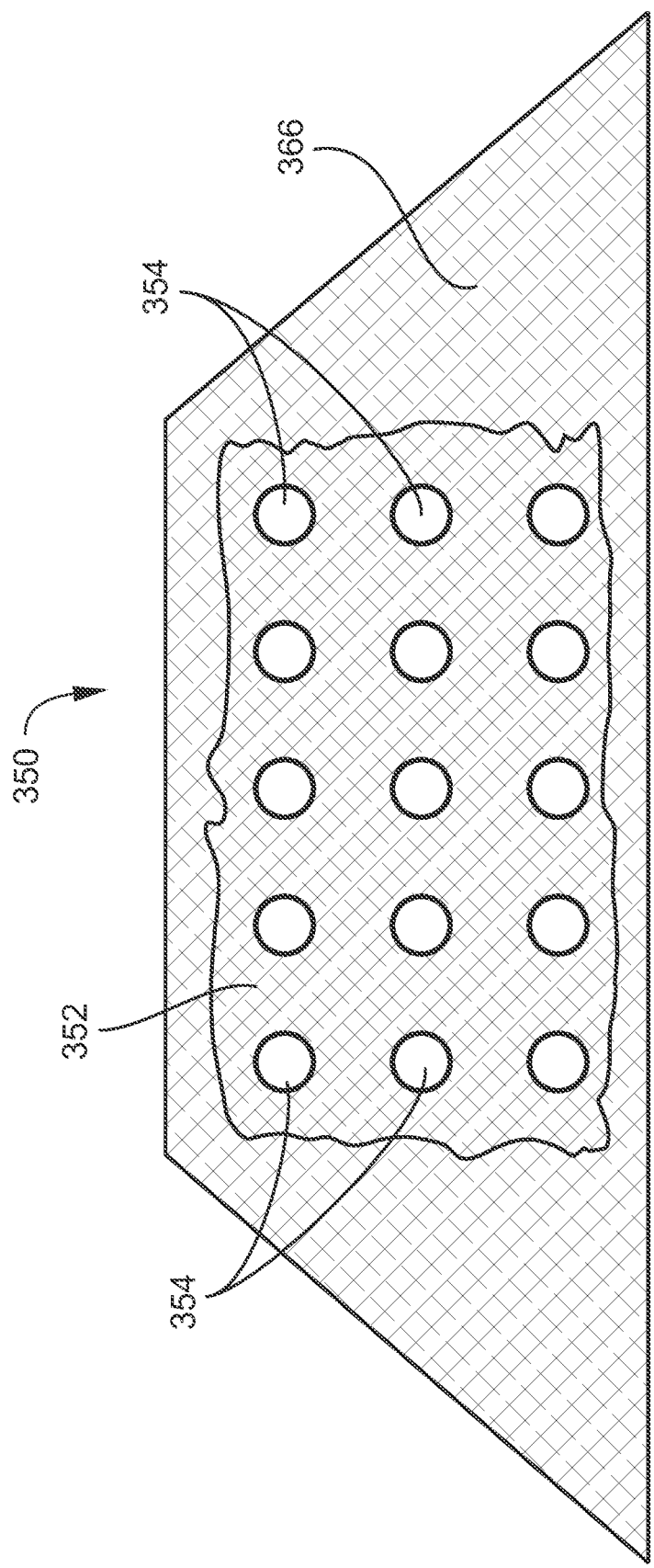
FIG. 23 is an elevation view of a CCR insulated heat exchanger.

As shown in FIG. 23, a heat exchange static structure 350 is constructed of a compact mass of CCR with other heat exchange media 352 such as molten salt or rock are used to encapsulate a series of heat exchange pipes 354. The CCR/heat exchange media are surrounded by a large mass of insulating CCR 366. Air, water or other flowable media circulates through the pipes 354 and transfer heats via temperature differential to the surrounding CCR/heat exchange media and the large mass of insulating CCR. Heat given off to or absorbed from the surrounding heat exchange media and CCR can be transported for use in the electricity generating process described in this application. The pipes 354 may serve as tanks with a single outlet, or may be "flow through" conduits, the flow through which is controlled by valves, as described above.

Figure 24:
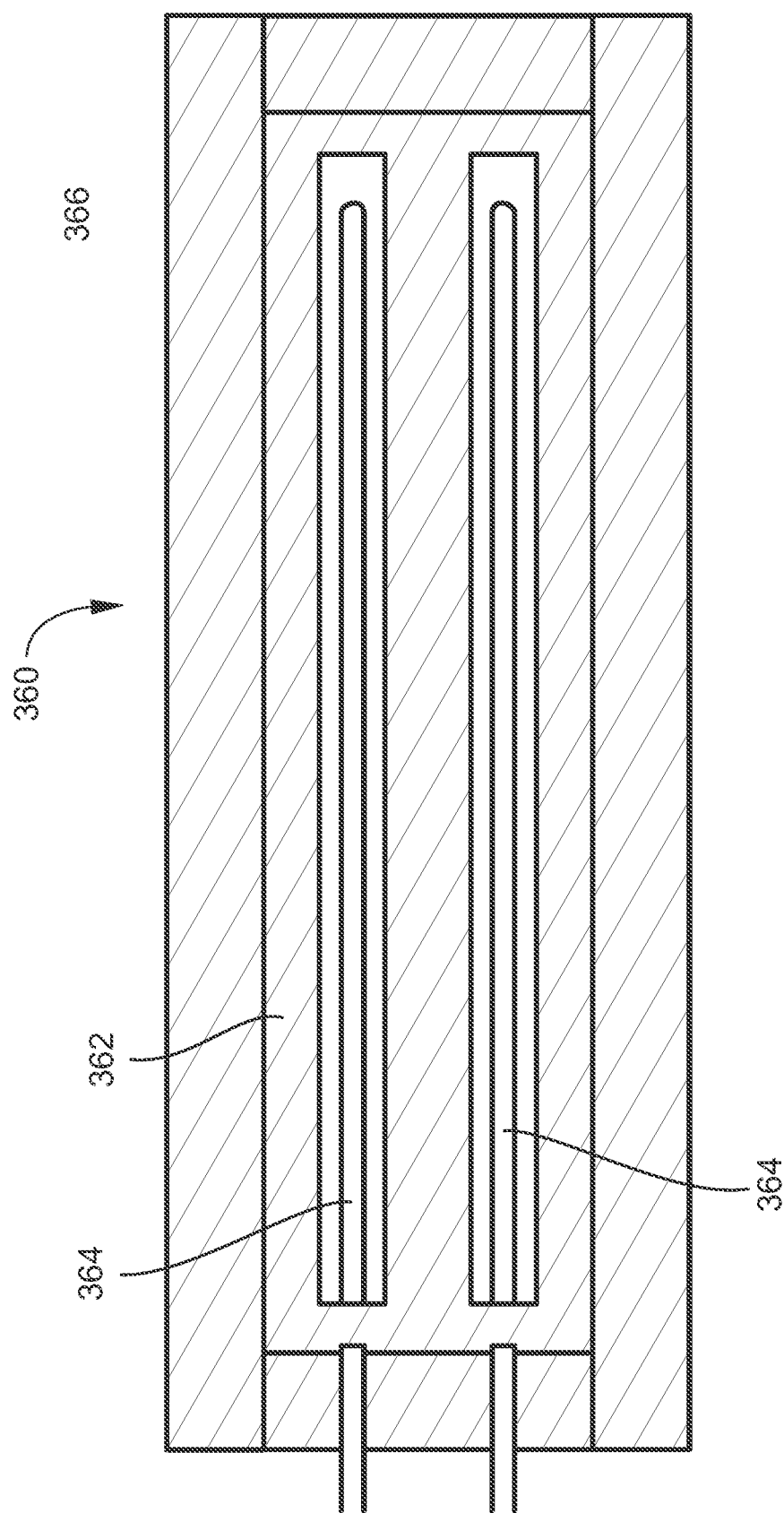
FIG. 24 is a top plan view of a CCR insulated heat exchanger.

As shown in FIG. 24, a "dead end" heat storage system 360 is shown a compact mass of CCR with other heat exchange media 362 such as molten salt, water or rock 362 is used to encapsulate a series of heat exchange pipes 364 in which is contained a flowable heat transfer medium such as water. The CCR/heat exchange media 362 are surrounded by a large mass of insulating CCR 366 which may have sloped sides as shown in FIG. 23. The expanded air will circulate in the hot side heat exchanges during the air expansion phase, hot air will be circulated thru the chilled water during energy storage/compression phase. Separate methods and piping systems to circulated hot water and chilled water during different phases can also be used. In addition to water being heated by the compression of air it can use other known methods of using excess electricity to heat the water. The same holds true for cooling of water—not only expansion of the air but other known methods for cooling also. Piping filled with water entering and exiting the heat exchanges and a separate set of piping for air which heats and cools the air may be used depending on the phase of the operation.

Figure 25:
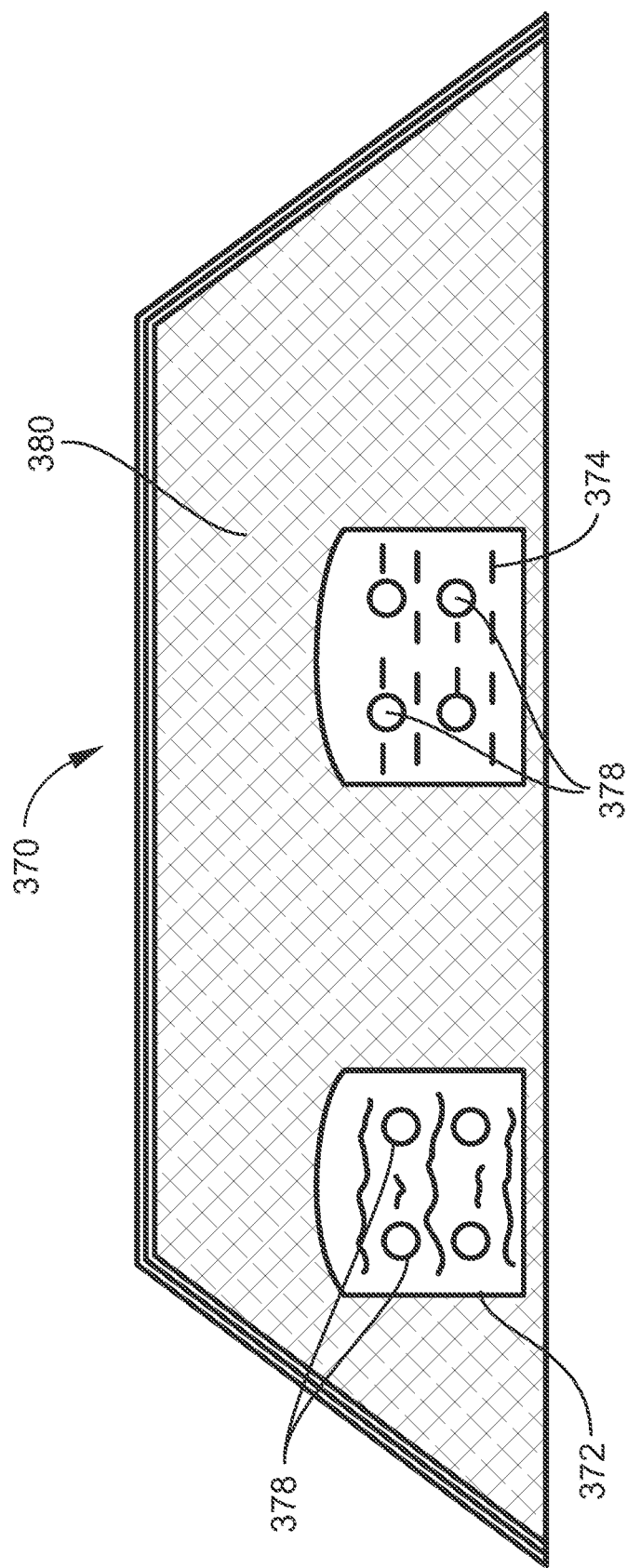
FIG. 25 is an elevation view of a CCR insulated structure housing both heated water and chilled water heat exchangers of FIG. 24.

As shown in FIG. 25, a heat storage system 370 is shown which may be similar to the heat storage system 360 of FIG. 24, that includes tanks 372 and 374 in which are positioned pipes 376 and 378, respectively. The tanks 372 and 374 are encapsulated in a large mass of CCR insulating material 380. The tanks 372 and 374 may be dedicated to heat transfer in opposite flow directions. For example, tank 372 may be charged with heated water or some other medium that is transferred to a flow medium such as water or air in the pipes 376, while tank 374 may be charged with chilled water that absorbs heat from a flow medium circulating in the pipes 378. In this system the tanks 372 and 374 may be isolated from each other and operate independently, or the pipes 376 and 378 may be interconnected through valves and the direction of flow of the flow medium controlled to maintain an overall temperature within a narrow range, or to maintain an extreme temperature differential. In either event heat is made available to operate the electricity generating facility at optimum efficiency. During the expansion phase of the liquid air and compressed air, the cooling can be used to help increase the efficiency of the turbomachinery in using the stored cooling from the previous expansion phase to help cool the compressed air during the next liquid air production cycle. Just as waste heat is used, material cooling from other industrial processes can be used to cool water or other materials for greater efficiencies of creating liquid air. One example is the waste cool produced during the expansion of LNG from ship at LNG terminals.

The CCR and piping as shown in FIGS. 14 and 15 may also be used to store the heat, using the CCR as an insulator. In one embodiment salt is mixed in with the CCR to provide greater energy density. Liquid air may be stored in the insulated pipes of FIGS. 14 and 15. The liquid air is under low pressure.

Figure 26:
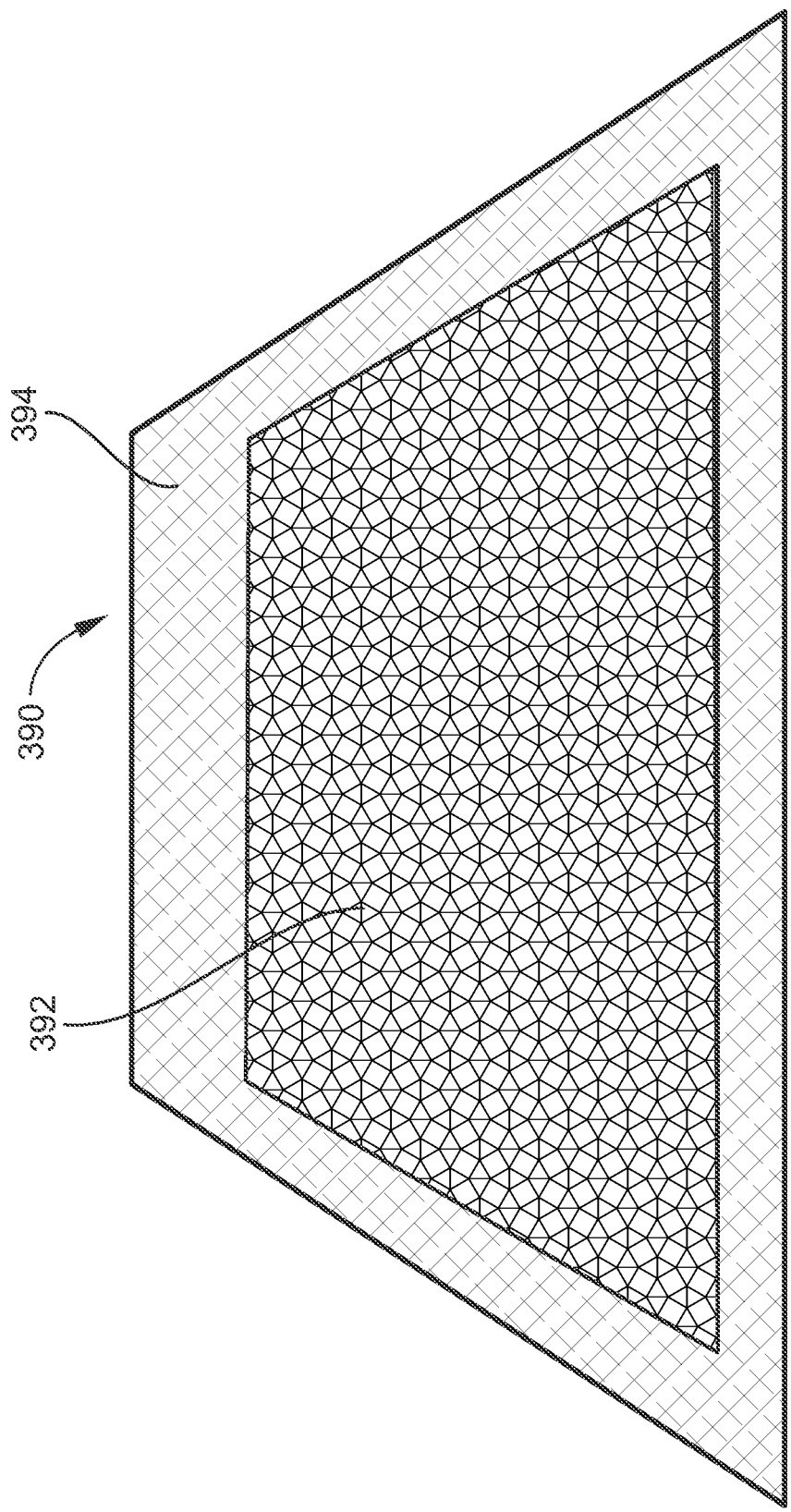
FIG. 26 is an elevation view of a CCR insulated structure within which is contained a heat exchange material.

Referring now to FIG. 26, a hypothetical CCR insulation structure 390 is shown and includes an inner core 392 comprised of, for example, CCR aggregates, CCR briquettes or other compositions of CCR with other heat exchange materials.

Some thermal energy storage systems where this invention may have application are:
1. Energy Nest https://energy-nest.com/
2. 1414 Degrees https://1414 degrees.com.au/
3. Malta https://www.maltainc.com/our-solution
4. Man Energy Solutions have several options including a molten salt and liquid air option: https://www.man-es.com/energy-storage/solutions/energy-storage
5. Siemens Gamesa—volcanic rocks https://www.siemensgamesa.com/en-int/products-and-services/hybrid-and-storage/thermal-energy-storage-with-etes.

There are other types of media flow besides air and water that can be used to operate the invention apparatus is this application, and in some locations, it will be beneficial to do so.

One example of this is to use the exhaust heat produced by the power industry generation processes or any other industrial or manufacturing processes that produces waste heat. This can include heated air and/or other types of heated gases. The engineering principles of the combined cycle power plant which uses waste heat from a gas turbine to produce steam to turn an additional steam powered generator can be used to the benefit of the apparatus invention in this application. Waste air or gases can be used to heat air in either the storage volume or the air before entering the pistons, or both, to increase the efficiency of the system in this invention. In some conditions, depending on the pressure and volume of the waste gases, there could be little to no storage volume required, just the use of the waste gases to propel the liquid media flow in the pistons and/or pneumatic cylinders.

In artic weather conditions, a liquid with a low freezing point could be used with air or waste gases that have had moisture removed to a specified level.

Another method would be to use a slurry mixture of comminuted solids mixed with lightweight oils, which allows for a dense media flow to be used. The comminuted solids could be made of many types of materials some of which are rubber, silicone, HDPE, steel or a combination of the materials together. The solids in the media flow could have different specific gravities to provide for a more evenly placed comminuted solids distribution in the slurry mixture. This type of dense media flow mixture could allow for a compact high-density recirculating type apparatus invention that uses water and/or other types of liquids and air or gas media.

Waste heat from the gas fired plants (on the same site as the existing CCR ponds and where the pressurized hydro facility will be located) may be mixed in a computer-controlled monitoring process into the pressure vessel with the liquids air that would be expanded to ambient air (and water temperature after expanding the air in piping that travels thru the existing CCR ponds and/or then thru piping that the air is expanded to ambient) temperature.

Waste heat may also be used to heat the water in the heat exchanger in the water ponds inside the CCR structures.

Pressure vessel exhaust air once the pressurized air pushes the water into the penstock can then be reuses to the recycle exhausted air (before expansion) by exhausting unexpanded air into an air compressor and/or suction or blower apparatuses that then push the air through a heat exchanger and recycle the exhausted air back for reuse into the pressure vessels. As a portion of the air is lost in the process, a separate computer controlled manifold system can feed air from the compressed air storage area.

Also, Waste heat can be mixed directly with liquid air after the liquid air is expanded and it reaches ambient temperature as pressurized air.

With the recent advancement of sub-sea gas compression technology, and with the wind industry constructing more offshore wind farms on floating platforms and with sub-sea oil and gas reservoirs reaching depletion stages, and with these reservoirs having the existing infrastructure in place, sub-sea depleted reservoirs can be an option for storing compressed air energy and using the apparatus invention included in this application. The apparatus invention of this application could be placed on the ocean floor, on a floating platform at the top of the water level or on nearby land.

When the apparatus invention is used in underwater conditions in natural waterbodies, an inline liquid/air separator can be used with the separated liquids being recirculated back into the depleted reservoir which will allow for only clean water and air to be exhausted from the pistons of the apparatus invention.

The compressed air energy storage volumes can be designed to be used as storage of fossil fuel gas, including natural gas and propane. This dual design capability will allow for fossil fuel gases to be stored if the need arises.

Design requirements of storage volumes for fossil fuels will consider static electricity and other factors that could accidently create an explosion from uncontrolled ignition of the gases.

As air is compressed the temperature rises per the known physics principle defined as the Heat of Compression. Since many of the apparatus inventions as described in this application will be near large sources of water, an opportunity exists to cool the air exiting each stage of the air compression stage and running it thru piping which runs into and then underneath the water at a designed length to cool the compressed air inside of the pipe. This can be in addition to or in lieu of the intercooling capabilities of the air compressor(s).

An apparatus and method for generation of electricity using pressurized water and air as respective flow media, according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A facility for generating electricity, comprising:
    (a) a hydroelectric generating apparatus including an elongate penstock in flow communication with a source of water and a hydro-turbine assembly;
    (b) piping for supplying refill water to a plurality of horizontal pistons on a synchronized and coordinated basis to supply pressurized water to the penstock;
    (c) a cryogenic facility including at least one cryogenically insulated storage tank for cryogenically producing and storing liquid air;
    (d) a temperature regulator for allowing controlled transition from the liquid air state to a pressurized gaseous state for supplying pressurized air to a storage container for supplying air to the pistons;
    (e) respective air exhaust/release valves for releasing the pressurized air in the pistons to the atmosphere or recycling and reuse of the pressurized air after use;
    (f) respective water inflow valves for refilling the pistons after the air exhaust/release valves open; and
    (g) a containment facility within which the cryogenic facility is encapsulated and comprising a mass of coal combustion residue (CCR) having sufficient insulating capacity to maintain the liquid air in a liquid state in combination with the cryogenic facility.

2. A facility for generating electricity according to claim 1, wherein the containment facility includes a compact mass of CCR intermixed with a heat exchange medium encapsulating a heat exchange pipe contained within the containment facility.

3. A facility for generating electricity according to claim 2, wherein the pipe comprises a plurality of pipes each having a single outlet and functioning as a storage facility for air in a liquid or gaseous state.

4. A facility for generating electricity according to claim 2, wherein the pipe comprises a plurality of pipes functioning as conduits adapted to circulate a flowable media for giving off to or absorbing heat from the surrounding heat exchange media.

5. A facility for generating electricity according to claim 2, and including a heat exchange facility comprising a plurality of tanks encapsulated in a large mass of CCR insulating material and in which are positioned respective pipes for circulating a flowable media for giving off to or absorbing heat from the surrounding heat exchange media.

6. A facility for generating electricity according to claim 5, wherein the tanks are encapsulated in a large mass of CCR insulating material.

7. A facility for generating electricity according to claim 5, wherein some of the plurality of tanks are dedicated to heat transfer in a first temperature flow direction and other of the plurality of tanks are dedicated to heat transfer to a second temperature flow direction.

8. A facility for generating electricity according to claim 7, wherein the plurality of tanks dedicated to heat transfer in a first temperature flow direction are flow isolated from the other of the plurality of tanks dedicated to heat transfer to a second temperature flow direction.

9. A facility for generating electricity according to claim 7, wherein the plurality of tanks dedicated to heat transfer in a first temperature flow direction are flow interconnected with the other of the plurality of tanks dedicated to heat transfer to a second temperature flow direction, the direction of flow of the flow medium adapted to be controlled to maintain an overall predetermined temperature of the flow medium to operate the hydroelectric generating apparatus.

10. A facility for generating electricity according to claim 5 wherein the heat exchange facility includes the large mass of CCR insulating material and an inner core comprised of heat exchange materials selected from the group consisting of CCR aggregates, CCR briquettes, salt, and rock.

11. A facility for generating electricity according to claim 1, wherein the containment facility is encapsulated in overlying multiple layers of material comprising CCR.

12. A facility for generating electricity according to claim 1, including:
   (a) a compressed air storage facility contained within a static structure having reinforced CCR sloped walls within which an enclosure encapsulated CCR-surrounded enclosure is formed;
   (b) a circuitous piping system positioned within the static structure for storing large quantities of the compressed air; and
   (c) a liner system covering the surfaces of the static structure.

13. A facility for generating electricity according to claim 12, and including a vegetative cover placed over the liner system.

14. A facility for generating electricity according to claim 12, wherein the compressed air storage facility is constructed substantially below ground level and the circuitous piping system is encased in poured-in-place concrete and including concrete reinforcement elements for structural strength and stability.

15. A facility for generating electricity according to claim 1, and wherein the hydro-turbine assembly includes drive shaft on which is mounted a flywheel, generator and turbine mounted in mutually-fixed relation for rotation with the drive shaft, the flywheel comprising:
   (a) an annular wheel housing;
   (b) a liquid compartment formed in the wheel housing and including a central chamber and a peripheral chamber interconnected for centrifugally induced liquid flow by a passageway; and
   (c) an enclosed volume of the liquid compartment adapted to be partially filled with a low viscosity whereby as the flywheel rotates the liquid will move outward and upward by centrifugal force to facilitate non-pulsating rotation of the turbine and additional momentum to the movement of the flywheel caused by liquid.

16. A facility for generating electricity according to claim 1, wherein the facility is a pumped-hydro facility including at least one hydroelectric pump generator.

17. A facility for generating electricity according to claim 16, and including:
   (a) raised elevation water storage reservoir formed by a base of CCR defining an angle of repose;
   (b) a water storage impoundment defined by raised impoundment walls constructed on the base and having their own angle of repose;
   (c) the impoundment walls formed of materials selected from the group consisting of roller-compacted concrete, strengthened CCR, and multiple layers of roller-compacted concrete;
   (d) at least one water drain positioned in a bottom of the water storage impoundment and including conduits to allow water to flow out of the impoundment through the drains and conduits and feed into the hydroelectric pump generators;
   (e) the hydroelectric pump generators adapted to reverse flow during low utilization periods; and
   (f) outflow from the impoundment adapted to generate electricity for use during peak use periods to supplement electricity generated by conventional electric utility generators.

18. A facility for generating electricity according to claim 16, and including a compressed air storage facility for storing compressed air generated by hydroelectric pump generators during low utilization periods, the compressed air communicating through valves and conduits with the hydroelectric pump generators to generate electricity.

19. A facility for generating electricity according to claim 16, and including:
   (a) a flywheel mounted for rotation on respective ones of the hydroelectric pump generators for increasing the efficiency of the hydro-turbine generator;
   (b) a drive shaft around which are fixed for rotation with the drive shaft an annular wheel housing and a liquid compartment formed in the wheel housing;
   (c) the liquid compartment including a central chamber and a interconnected peripheral chamber for centrifugally inducing liquid flow through a passageway between the peripheral chamber and the central chamber; and
   (d) the liquid compartment adapted to be at least partially filled with a low viscosity liquid that will move outward and upward by centrifugal force once the rotation of the flywheel begins.

20. A facility for generating electricity according to claim 1, and including: (a) a heat exchange static structure constructed of a compact mass of CCR with heat exchange media encapsulating at least one heat exchange pipe for circulating a flowable media for transferring heat via temperature differential to the surrounding CCR/heat exchange media; and (b) the heat exchange static structure surrounded by a mass of insulating CCR transfer heats via temperature differential to the surrounding CCR/heat exchange media.

21. A facility for generating electricity according to claim 1, wherein heat given off to or absorbed from the surrounding heat exchange media is adapted to be transported to the temperature regulator for allowing controlled transition from the liquid air state to the pressurized gaseous air state for supplying pressurized air to a storage container and for supplying air to the pistons of the hydroelectric generating apparatus.

* * * * *